(12) United States Patent
Abu-Ageel

(10) Patent No.: US 7,719,738 B2
(45) Date of Patent: May 18, 2010

(54) METHOD AND APPARATUS FOR REDUCING LASER SPECKLE

(76) Inventor: Nayef M. Abu-Ageel, 45K Rolling Green Dr., Fall River, MA (US) 07270

( * ) Notice: Subject to any disclaimer, the term of this patent is extended or adjusted under 35 U.S.C. 154(b) by 160 days.

(21) Appl. No.: 12/126,867

(22) Filed: May 24, 2008

(65) Prior Publication Data
US 2009/0128918 A1   May 21, 2009

Related U.S. Application Data

(63) Continuation of application No. 11/232,310, filed on Sep. 21, 2005, now Pat. No. 7,379,651, and a continuation-in-part of application No. 11/066,605, filed on Feb. 25, 2005, now Pat. No. 7,301,701, and a continuation-in-part of application No. 11/066,616, filed on Feb. 25, 2005, now Pat. No. 7,318,644, and a continuation-in-part of application No. 11/067,591, filed on Feb. 25, 2005, now Pat. No. 7,475,992, which is a continuation-in-part of application No. 10/458,390, filed on Jun. 10, 2003, now Pat. No. 7,306,344.

(51) Int. Cl.
*G02B 5/08* (2006.01)
*G02B 6/00* (2006.01)
*G02B 6/42* (2006.01)

(52) U.S. Cl. ............... 359/201.2; 359/209.1; 359/602; 356/513; 356/132; 385/31; 385/32; 372/99; 372/103

(58) Field of Classification Search ............... 359/201.2, 359/209.1, 602; 356/513, 132; 385/31, 32; 372/99, 103
See application file for complete search history.

(56) References Cited

U.S. PATENT DOCUMENTS

| | | | | |
|---|---|---|---|---|
| 5,224,200 A | * | 6/1993 | Rasmussen et al. | 385/146 |
| 5,313,479 A | * | 5/1994 | Florence | 372/26 |
| 6,594,090 B2 | | 7/2003 | Kruschwitz | |
| 6,897,992 B2 | | 5/2005 | Kikuchi | |
| 7,298,940 B2 | * | 11/2007 | Abu-Ageel | 385/31 |
| 7,379,651 B2 | * | 5/2008 | Abu-Ageel | 385/146 |

OTHER PUBLICATIONS

B. Dingle, "Speckle-Free Image in a Laser-Diode Microscope by Using the Optical Feedback Effect", Optics Letters, vol. 18, No. 7, Apr. 1993, pp. 549-551, Optical Soc. of Amer.

* cited by examiner

*Primary Examiner*—Nikita Wells
(74) *Attorney, Agent, or Firm*—Gavrilovich, Dodd & Lindsey LLP

(57) ABSTRACT

An apparatus and method for reducing speckle of a laser beam is disclosed. The apparatus includes a light guide, a highly reflective mirror at the input face of the light guide and a partially-transmissive display after the exit face of the light guide. A coherent laser beam is introduced into the light guide through a clear aperture in the highly reflective mirror. Within the light guide, the laser beam gets separated into plural, successive beamlets having different phase shifts, different polarization states and/or path length differences equal to or greater than the coherence length of the laser beam. The beamlets exit through the partially-transmissive display to provide output laser light with reduced speckle. The light guide can be either a solid light pipe of transmissive material or a hollow tunnel with reflective interior sidewalls.

24 Claims, 23 Drawing Sheets

METHOD AND APPARATUS FOR REDUCING LASER SPECKLE

CROSS-REFERENCE TO RELATED APPLICATIONS

This application is a continuation of U.S. patent application Ser. No. 11/232,310 filed on Sep. 21, 2005 now U.S. Pat. No. 7,379,651, which is a continuation-in-part of patent application Ser. No. 10/458,390, now U.S. Pat. No. 7,306,344 filed on Jun. 10, 2003, patent application Ser. No. 11/066,605, now U.S. Pat. No. 7,301,701 filed on Feb. 25, 2005, patent application Ser. No. 11/066,616, now U.S. Pat. No. 7,318,644 filed on Feb. 25, 2005, and U.S. patent application Ser. No. 11/067,591, entitled "Light Recycler and Color Display System Including Same," filed on Feb. 25, 2005. The aforementioned patents and application are incorporated by reference herein as though set forth in full.

TECHNICAL FIELD

The present invention relates generally to laser illumination systems. More particularly, the present invention relates to a method and apparatus for reducing laser speckle.

BACKGROUND

Due to their many advantages, which include high brightness and desirable spectral and angular beam characteristics, lasers are considered attractive light sources for various applications such as projection displays, microscopy, microlithography, machine vision and printing. However, one drawback to using lasers in these systems is speckle. Basically, speckle is an undesirable variation in the cross-sectional intensity of a laser beam. In laser projection systems, it usually makes images appear grainy and less sharp. Speckle is due to interference patterns that result from the high degree of temporal and spatial coherence of light emitted by most lasers. When such coherent light is reflected from a rough surface or propagates through a medium with random refractive index variations, speckle shows up as an uneven, random distribution of light intensity. This uneven brightness degrades the quality and usefulness of laser illumination systems.

The prior art describes various techniques for speckle reduction. For example, in U.S. Pat. No. 5,224,200, Rasmussen et al. propose a speckle reduction apparatus 10, as illustrated in FIG. 1. The system consists of a coherence delay line in series between a laser and a homogenizer 28. The coherence line consists of a totally reflecting mirror 24 and a partially reflecting mirror 22 separated by a distance 25 equal to an integer multiple of half the coherence length of the original laser beam. The laser beam 20 strikes the partially reflecting mirror 22 first, which transmits part of the beam and reflects the remainder toward the totally reflecting mirror 24 where it is reflected back toward the partially reflecting mirror 22. This process continues until the reflected beam bypasses the partially reflecting mirror 22. This final beam and the series of beams transmitted through the partially reflecting mirror 22 are focused by a lens 26 into a homogenizer 28. Beams entering the homogenizer 28 are offset by multiples of their coherence length, leading to a reduction in their apparent coherence length, which in turn, reduces the amount of speckle.

In U.S. Pat. No. 5,313,479 to J. M. Florence and U.S. Pat. No. 6,594,090 B2 to Kruschwitz et al., a moving diffuser is used to remove or reduce the speckle pattern.

In U.S. Pat. No. 6,897,992 B2 to H. Kikuchi, the laser beam is rotated and equally divided into its S and P polarization components. After separating the S and P polarization components, an optical path difference that is at least equal to the coherence length of the laser beam is generated between the S and P polarization components through appropriate delay means. The '992 patent also discloses an intensity separation means for dividing the laser beam into two or more parallel beamlets and delaying the beamlets relative to each other by an optical path difference that is at least equal to the coherence length of the laser.

B. Dingel et al. in "Speckle-Free Image in a Laser-Diode Microscope by Using the Optical Feedback Effect," Optics Letters, Vol. 18, No. 7, April 1993, pp 549-551, teach a method of removing laser speckle by broadening the spectral linewidth of a laser and generating an output beam having a multimode spectrum that changes with time. This result is obtained by feeding a moderate amount of the laser light back into the cavity of the laser through the use of mirror, beam splitter and multimode fiber.

Although the above methods of speckle reduction are effective in some applications, they nevertheless suffer from one or more of the following disadvantages: moving or vibrating parts, low degree of compactness, long integration time, excessive loss of light energy (i.e., inefficiency), and/or lack of control over the spatial distribution of light in terms of angle and intensity.

Therefore, there is a need for a simple, compact, light weight, short-integration time, and efficient speckle reduction apparatus that provides control over the spatial distribution of laser light in terms of intensity and angle over a certain target area, such as the active area of a display panel.

SUMMARY

It is an advantage of the present invention to provide a relatively compact, light weight, short-integration time (or instantaneous integration time), efficient speckle reduction apparatus capable of producing an output light beam of selected cross-sectional area and spatial distribution of intensity and angle. The improved speckle reduction apparatus can efficiently couple light from laser sources (e.g., a single laser or laser array) having a variety of sizes and shapes to illumination targets of various shapes and sizes. The present invention also provides an improved method of speckle reduction.

Various aspects, features, embodiments and advantages of the invention are described in the following figures and detailed description, or they will be or will become apparent to one with skill in the art upon examination of the following figures and detailed description. It is intended that all of these aspects, features, embodiments and advantages be included within this description, be within the scope of the invention, and be protected by the accompanying claims, which ultimately define the present invention.

BRIEF DESCRIPTION OF THE DRAWINGS

It is to be understood that the drawings are solely for purpose of illustration and do not define the limits of the invention. Furthermore, the components in the figures are not necessarily to scale, emphasis instead being placed upon illustrating the principles of the invention. In the figures, like reference numerals designate corresponding parts throughout the different views.

DETAILED DESCRIPTION

The following detailed description, which references to and incorporates the drawings, describes and illustrates one or more specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art. The word "exemplary" is used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make and use the invention, and not necessarily to limit the scope of legal protection afforded the appended claims.

Disclosed herein are various exemplary configurations of a laser speckle reduction apparatus that incorporates at least a light guide (e.g., a light pipe or tunnel), a highly reflective mirror (e.g., mirror plate) and a partially reflective mirror (e.g., mirror plate). In operation, the speckle reduction apparatus splits an input laser beam into many beamlets separated from each other by an optical path length difference that is preferably at least equal to the coherence length of the laser beam. The laser speckle reduction apparatus is advantageous in that it is static, i.e., it does not include any moving or vibrating parts.

Also disclosed are exemplary display systems embodying some of the laser speckle reduction structures described herein.

Figure 1:
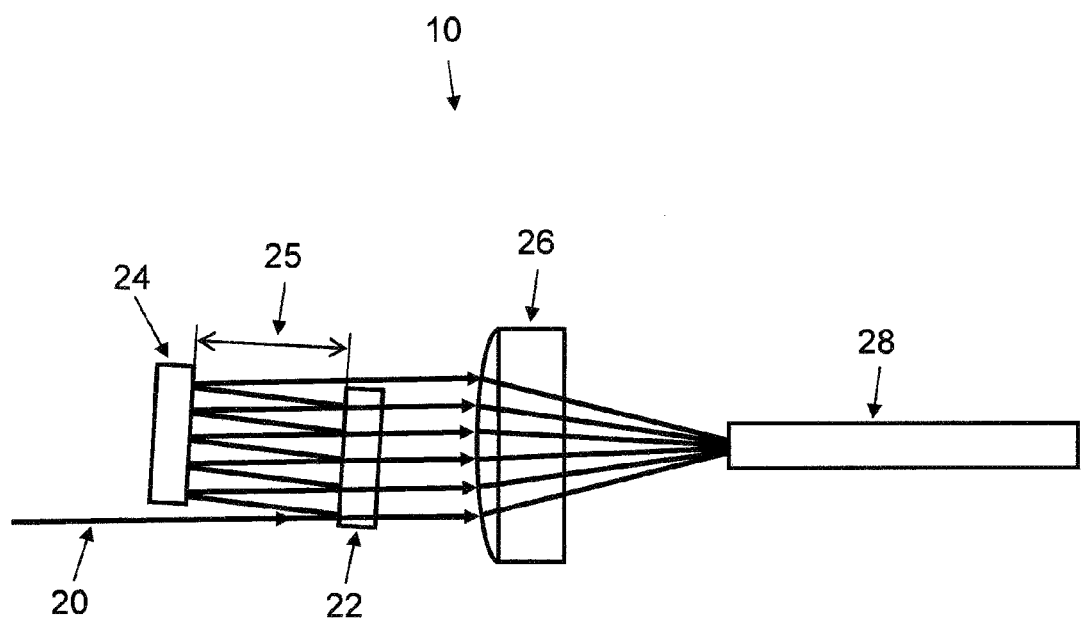
FIG. 1 is a cross-sectional view of a prior art speckle reduction apparatus.
Figure 2A:
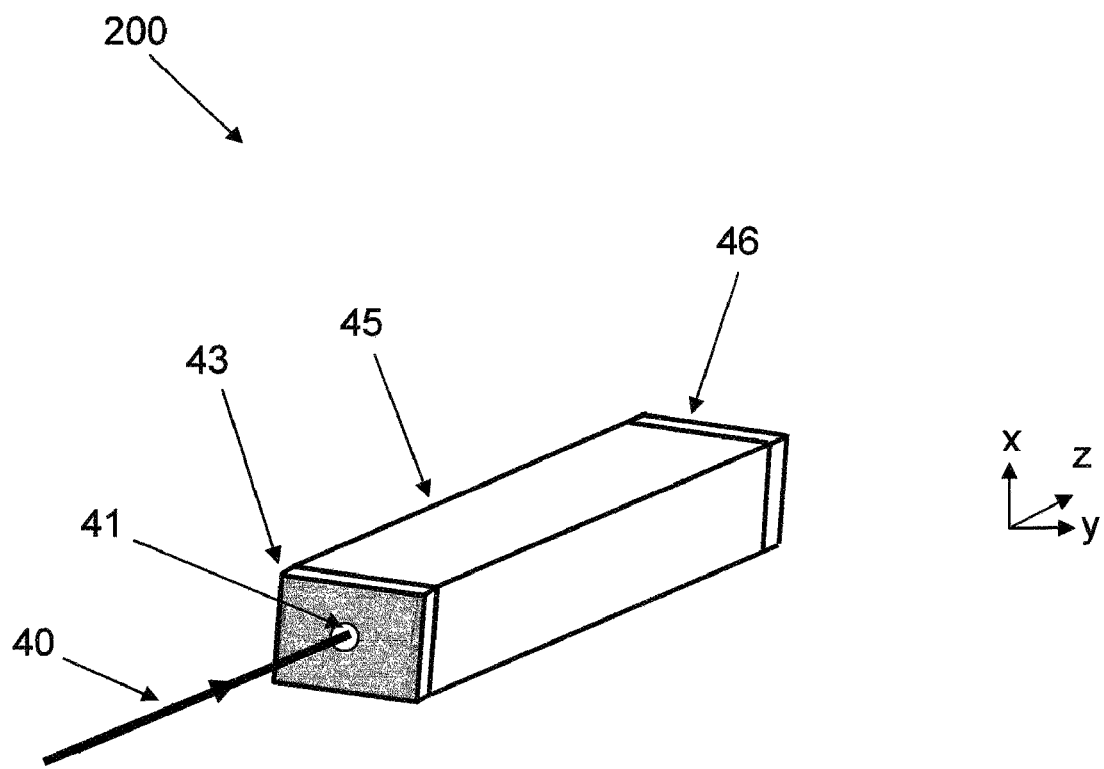
FIG. 2A is a perspective view of a speckle reduction apparatus utilizing a highly reflective mirror, partially reflective mirror, light guide and an optional plano-concave lens.
Figure 2B:
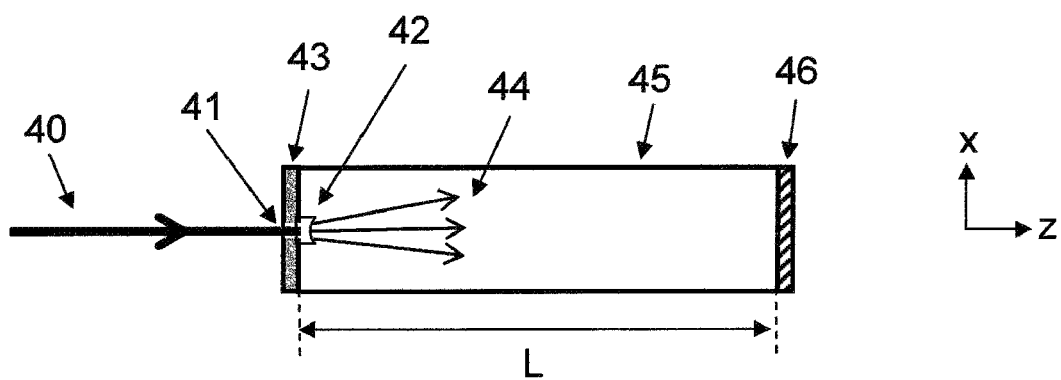
FIG. 2B is a cross-sectional view of the system of FIG. 2A.

Turning now to the drawings, FIGS. 2A and 2B show perspective and cross-sectional views of a speckle reduction apparatus 200 including a light guide 45, such as a light guide with reflective sidewalls, a highly reflective mirror 43, a partially reflective mirror 46 and an optional plano-concave lens 42 (shown in FIG. 2B). The partially reflective mirror 46 is located at the exit face of the light guide 45 and the totally (or at least highly) reflective mirror 43 is located at the guide's input face. A clear aperture formed in the highly reflective mirror 46 allows the introduction of the input laser beam into the light guide 45.

The highly reflective mirror 43 is preferably made of metal and/or dielectric coatings that reflect all or most of the incident light toward the partially reflective mirror 46. The partially reflective mirror 46 is preferably made of dielectric coatings that reflect part of the incident light back toward the highly reflective mirror 43 and transmit the remainder.

The function of the plano-concave lens 42 is to expand the cone angle of the laser beam 40 into a desired cone angle. This lens 42 is attached to the highly reflective mirror 43 using optically transmissive adhesive. The highly reflective mirror 43 and partially reflective mirror 46 are attached to the entrance and exit faces, respectively, of light guide 45 using an appropriate adhesive. The distance L between the highly reflective mirror 43 and partially reflective mirror 46 is preferably equal to an integer multiple of half the coherence length of the input laser beam 40. As us apparent to one of ordinary skill in the art, the coherence length of a laser is the distance over which interference will occur when the laser beam is split.

The light guide 45 can be solid light pipe made of optically transmissive material such as glass with polished surfaces or hollow light tunnel with reflective sidewalls and can also be straight or tapered light guide. The length of light guide ranges from few millimeters to tens of millimeters depending on the size of its entrance and exit apertures, cone angle of light propagating within the light guide 45, coherence length of propagating light and degree of desired light uniformity. Examples of some suitable light guides are described in related U.S. patent application Ser. Nos. 10/458,390, filed on Jun. 10, 2003, and 11/066,616, filed on Feb. 25, 2005, which are incorporated herein by reference.

Laser light 40 enters an optional plano-concave lens 42 through a clear aperture 41 as shown in FIG. 2. The clear aperture 41 is formed in the totally reflective mirror 43 to permit the introduction of the laser light 40 into the light guide 45. The size and shape of the clear aperture 41 can be circular, square, rectangular, oval or any other shape. It is also possible to have an array of clear apertures associated with an array of optional plano-concave lenses and corresponding to an array of lasers.

The plano-concave lens 42 is used to form a conical beam divergence symmetrically centered along the optical axis of the system 200. Other types of lenses such as a plano-convex lens, a plano-convex micro-lens array, a plano-concave micro-lens array, holographic diffuser or non-holographic diffuser or the like can be used to perform the function of lens 42.

The light source producing beam 40 can be a monochromatic laser, polychromatic laser (e.g. tunable laser) or precombined monochromatic lasers. There is no limitation on the laser power or wavelength which can be, for example, in the UV, visible or infrared range. The speckle reduction apparatus 200 can be used with lasers having coherence lengths ranging from small (few millimeters) to large (meters).

The laser light 40 exits the optional plano-concave lens 42 as a divergent beam 44 with a desired cone angle. This light 44 becomes more spatially uniform as it travels within the light guide 45. When this light 44 initially strikes the partially reflective mirror 46, part of it (i.e., the first beamlet) passes through and exits the speckle reduction apparatus 200 while the remainder gets reflected back toward the highly reflective mirror 43. A small part of this reflected light exits the speckle reduction apparatus 200 through the clear aperture 41 toward the laser and the remainder gets reflected back by the highly reflective mirror 43 toward the partially reflective mirror 46. This light strikes the partially reflective mirror 46 for the second time and a second beamlet exits speckle reduction apparatus 200 while the remainder gets reflected back toward the highly reflective mirror 43. This process continues until the light beam 44 exits the speckle reduction apparatus 200 through the partially reflective mirror 46.

Since the two mirrors 43 and 46 are separated by a distance preferably equal to an integer multiple of half the coherence length of the input laser beam 40, the beamlets exiting the partially reflective mirror 46 are all offset by multiples of the coherence length. Thus, the beamlets exiting the speckle reduction apparatus 200 recombine incoherently, leading to a reduction in the coherence length of the output recombined beam.

Even if the distance between the two mirrors 43 and 46 is less than half the coherence length of the laser beam 40, the beamlets exiting the partially reflective mirror 46 will have non-identical spatial distribution in terms of intensity and angle leading to the averaging and reduction of the speckle pattern. The optional plano-concave lens 42 increases the non-identical spatial distribution of the laser light, and thus, increases the reduction of speckle in situations where the mirror spacing is less than the coherence length.

In an alternative construction of the speckle reduction apparatus 200, the sizes of the two mirrors 43 and 46 as well as the clear aperture 41 are designed to permit feeding the required amount of the laser light back into the laser cavity to broaden the spectral linewidth of the laser and produce time varying linewidth spectrum. In this case, the single-mode laser is transformed into a multi-mode laser whose multi-mode spectrum changes with time by relaxation oscillation and multiple external cavity modes, thus, leading to a reduction in the coherence length of the laser and the observed speckle pattern. This optical feedback effect is described in more detail by B. Dingel et al. in "Speckle-Free Image in a Laser-Diode Microscope by Using the Optical Feedback Effect," Optics Letters, Vol. 18, No. 7, April 1993, pp 549-551, which is hereby incorporated by reference.

Figure 3A:
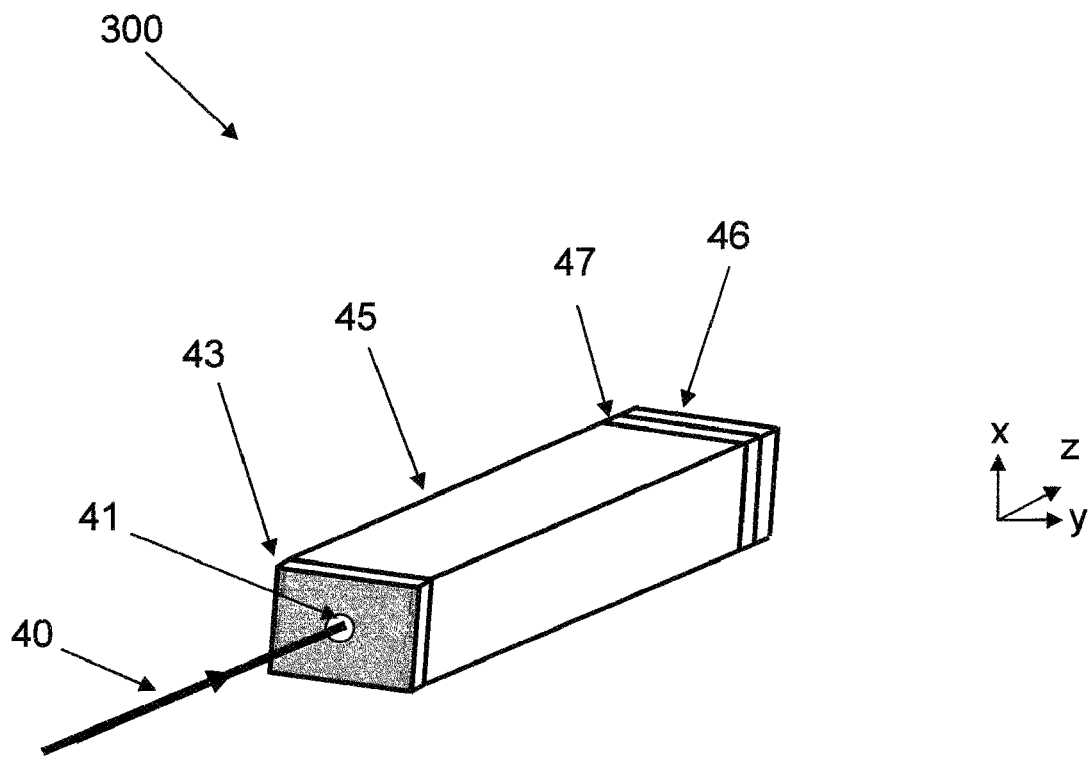
FIG. 3A is a perspective view of a speckle reduction apparatus having a first structure utilizing a highly reflective mirror, partially reflective mirror, light guide, a retardation plate and an optional plano-concave lens.
Figure 3B:
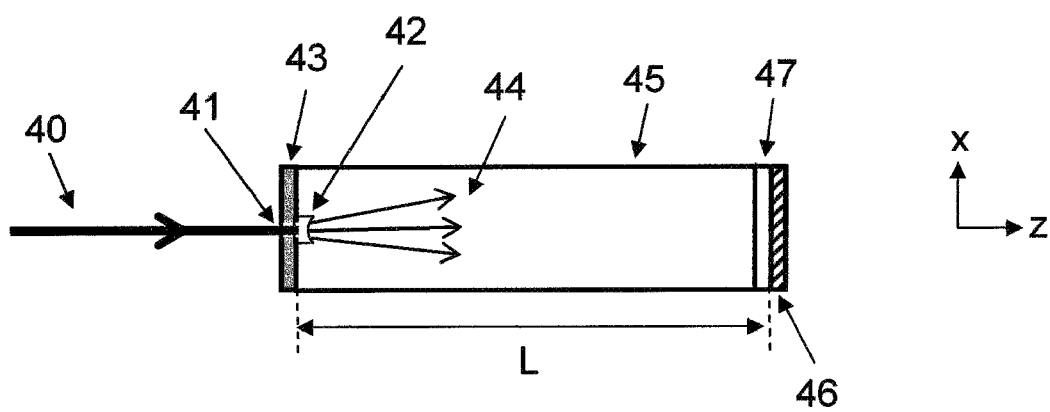
FIG. 3B is a cross-sectional view of the system of FIG. 3A.

FIGS. 3A-B show perspective and cross-sectional views, respectively, of another speckle reduction apparatus 300. The apparatus 300 includes the light guide 45, a highly reflective mirror 43, a partially reflective mirror 46, a retardation plate 47 and an optional plano-concave lens 42. The retardation plate 47 is placed before the partially reflective mirror or after totally reflective mirror. The retardation plate allows the speckle reduction apparatus to deliver beamlets with various polarization components that are separated from each other by an optical path difference at least equal to the coherence length of the laser beam.

The distance L between the highly reflective mirror 43 and partially reflective mirror 46 is preferably equal to an integer multiple of half the coherence length of the laser beam 40. The retardation plate 47 is used to induce a phase retardation of a desired value which leads to multiple beamlets with different polarization states and reduced speckle pattern. The wave plate is preferably a cut and polished piece of uniaxial crystal such as quartz and $MgF_2$. In uniaxial crystals, light passing through the crystal experiences a different refractive index and phase delay in one crystal axis relative to the other two crystal axis.

In an alternative construction of the speckle reduction apparatus 300, the retardation plate 47 is placed at the opposite end of the system 300, between the highly reflective mirror 43 and the light guide 45.

Figure 4A:
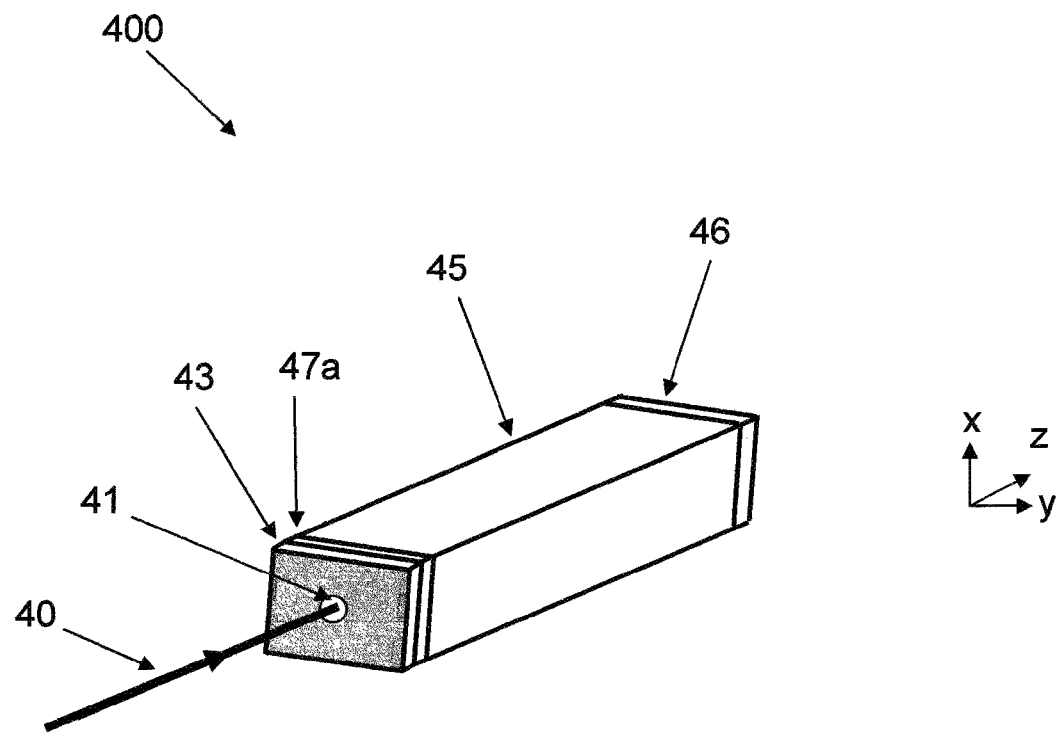
FIG. 4A is a perspective view of a speckle reduction apparatus having a second structure utilizing a highly reflective mirror, partially reflective mirror, light guide, a retardation plate and an optional plano-concave lens.
Figure 4B:
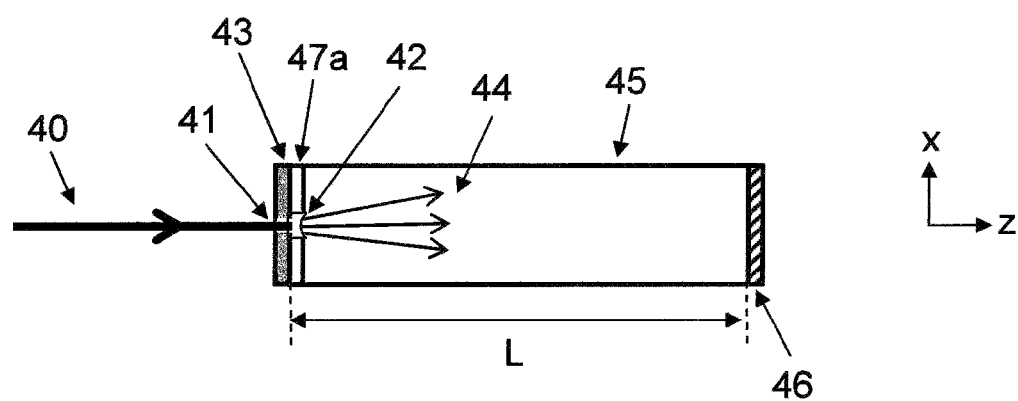
FIG. 4B is a cross-sectional view of the system of FIG. 4A.

FIGS. 4A-B illustrate a further configuration of a speckle reduction apparatus 400. The apparatus 400 divides a polarized light component of laser beam 40 into S polarized light component and P polarized light component (as discussed below) and generates an optical path difference between the S and P polarized light components not less than the coherence length of the laser beam 40. The two components are preferably divided into two equal S and P polarized light components.

The speckle reduction apparatus 400 is a special case of the speckle reduction apparatus 300 previously described above and utilizes a quarter wavelength plate 47a with an opening for initially introducing the polarized laser light 40 to the light guide 45 without experiencing any retardation. The plate 47a is placed between the highly reflective mirror 43 and the light guide 45. The polarized laser light 44 impinges on the partially reflective mirror 46 where a first beamlet with S polarized light component (or P polarized light component depending on the laser and its orientation) is transmitted and the remainder is reflected back toward the highly reflective mirror 43. During one round-trip in the solid light pipe or hollow light tunnel 45 the light passes twice through the quarter wavelength plate 47a and its polarization state is rotated by 90 degrees. Thus, the second transmitted beamlet exits with a P polarized light component, which is orthogonal to that of the first beamlet. Successive beamlets will have orthogonal polarization states alternating between the P and S states. Since the two mirrors 43 and 46 are separated by a distance preferably equal to an integer multiple of half the coherence length of the laser beam 40, the beamlets exiting the partially reflective mirror 46 are all offset by multiples of their coherence length. Thus, the beamlets exiting the speckle reduction apparatus 400 recombine incoherently leading to a reduction in the coherence length of the recombined beam.

In an alternative construction of the speckle reduction apparatus 400, the quarter wavelength plate 47a is placed between the partially reflective mirror 46 and the light guide 45. In this construction, the laser beam 40 is initially rotated so that a circularly polarized light component impinges on the quarter wavelength plate 47a, which in turn results in a first beamlet with a linearly polarized light component exiting the partially reflective mirror 46. During one round-trip in the solid light pipe or hollow light tunnel 45, the light passes twice through the quarter wavelength plate 47a and its polarization state is rotated by 90 degrees. Thus, the second transmitted beamlet exits with a polarized light component orthogonal to that of the first beamlet. Successive beamlets will have orthogonal polarization states alternating between the P and S states.

The laser beam 40 can be initially rotated to generate a circularly polarized light component by, for example, placing another quarter wavelength plate just before the highly reflective mirror 43. The circularly polarized light component then enters through the aperture 41 into the speckle reduction apparatus 400.

Figure 5A:
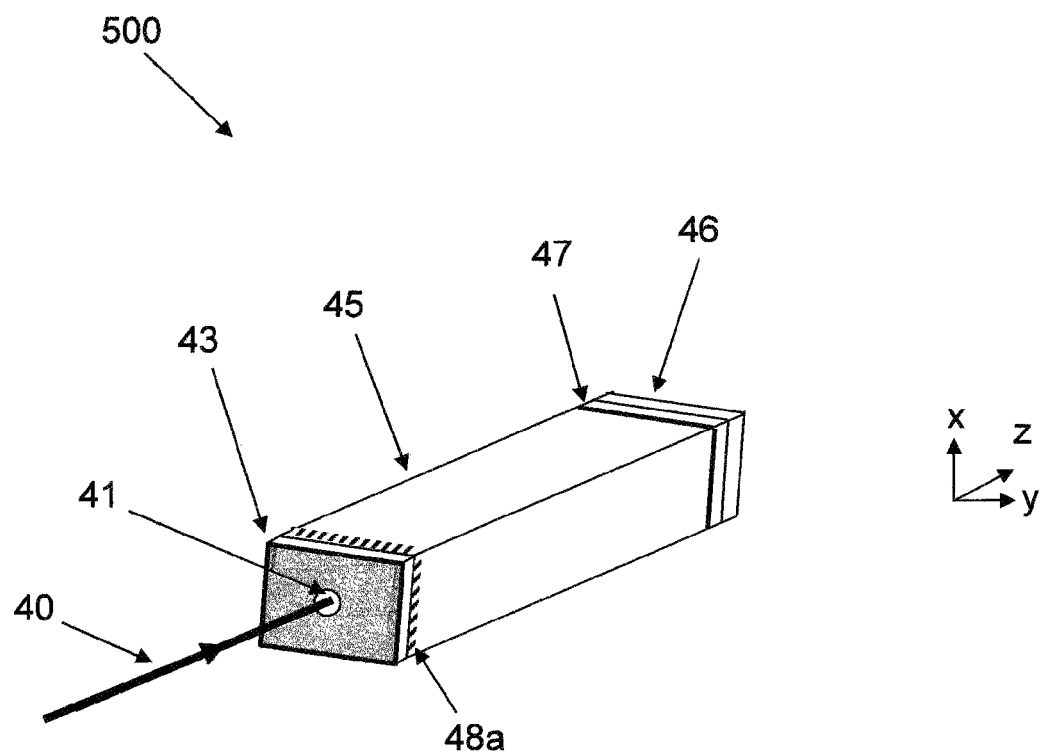
FIG. 5A is a perspective view of a speckle reduction apparatus utilizing a highly reflective mirror, partially reflective mirror, light guide, an optional retardation plate, a transmissive diffuser and an optional plano-concave lens.
Figure 5B:
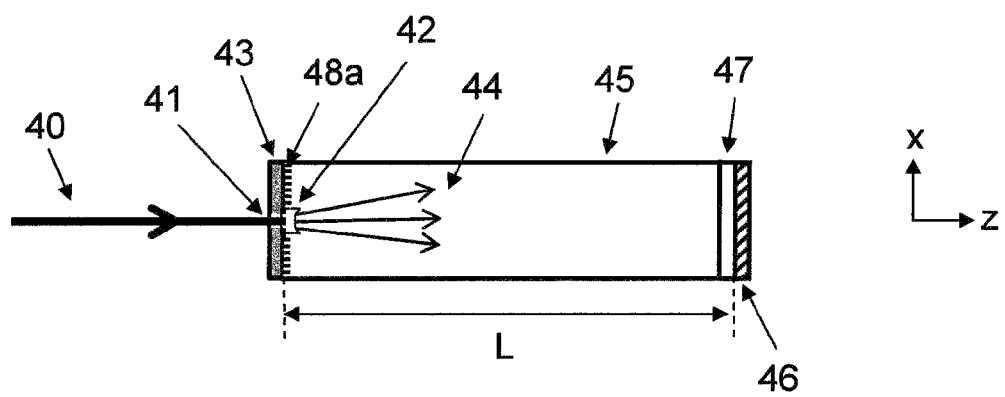
FIG. 5B is a cross-sectional view of the system of FIG. 5A.

FIGS. 5A-B show perspective and cross-sectional views, respectively, of another speckle reduction apparatus 500. The apparatus 500 includes the light guide 45, a highly reflective mirror 43, a partially reflective mirror 46, an optional retardation plate 47, a transmissive diffuser 48a and an optional plano-concave lens 42. Diffusers are a type of diffractive optical components that can take a laser beam and redistribute the light into a desired angular pattern. Diffusers can be made using different methods including holography and binary optics. Diffusers have different impact on polarized light depending on their types and materials. The transmissive diffuser 48a is used to induce a phase shift of a desired value which leads to transmitting beamlets with different phase shifts and reduced, averaged speckle patterns.

The distance L between the highly reflective mirror 43 and partially reflective mirror 46 is preferably equal to an integer multiple of half the coherence length of the laser beam 40.

In an alternative construction of speckle reduction apparatus 500, the transmissive diffuser 48a is placed between the optional retardation plate 47 and the light guide 45.

Figure 6A:
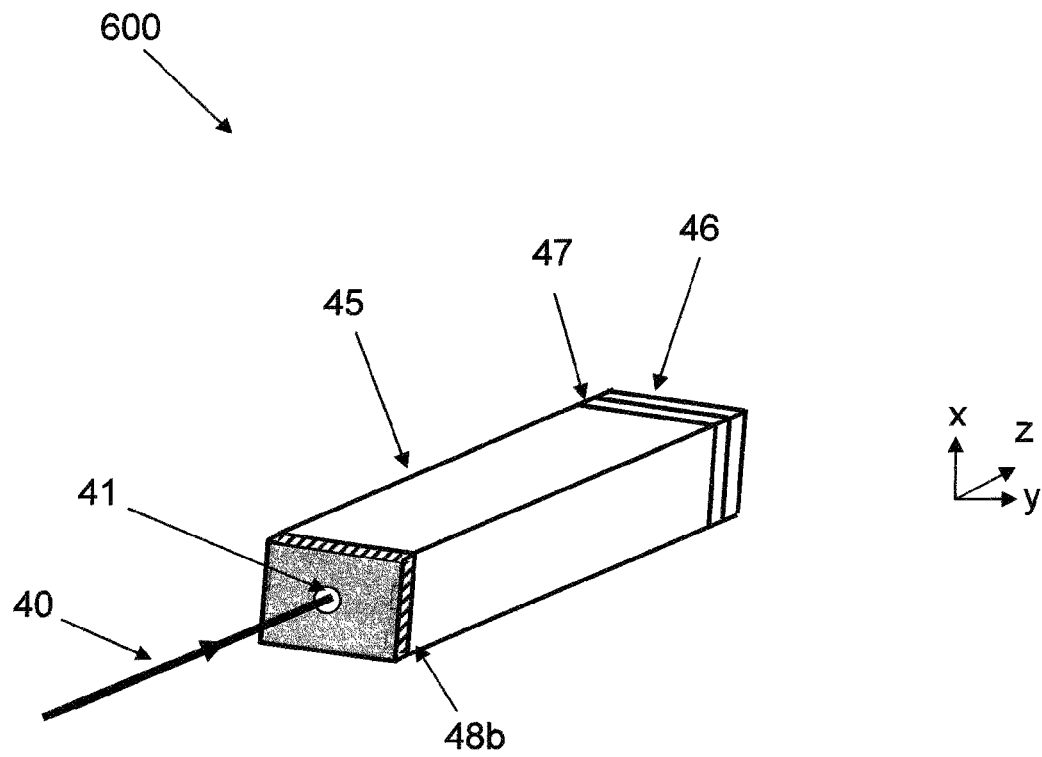
FIG. 6A is a perspective view of a speckle reduction apparatus utilizing a partially reflective mirror, light guide, an optional retardation plate, a reflective diffuser and an optional plano-concave lens.
Figure 6B:
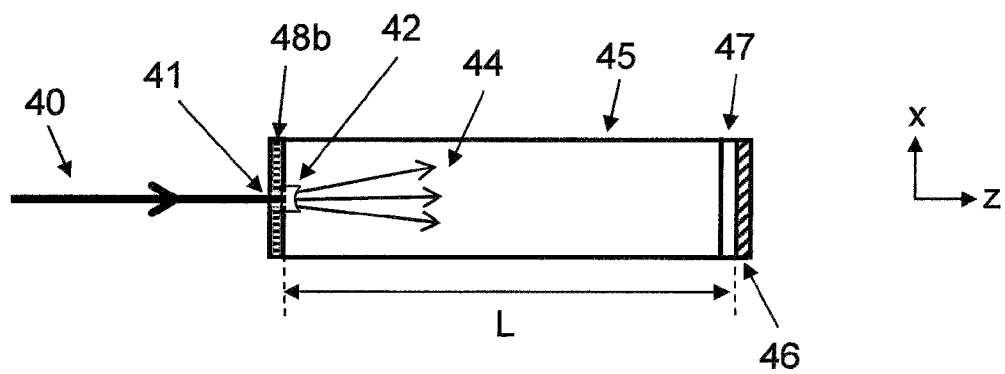
FIG. 6B is a cross-sectional view of the system of FIG. 6A.

FIGS. 6A-B show perspective and cross-sectional views, respectively, of another configuration of a speckle reduction apparatus 600. The apparatus 600 includes the light guide 45, a partially reflective mirror 46, an optional retardation plate 47, a reflective diffuser 48b and an optional plano-concave lens 42. The reflective diffuser reflects the received light beam rather than transmitting it (as in the case of the transmissive diffuser 48a) with the reflected light having the desired angular distribution. In addition to acting as a diffuser, the reflective diffuser 48b performs the function of the highly reflective mirror 43.

Figure 7A:
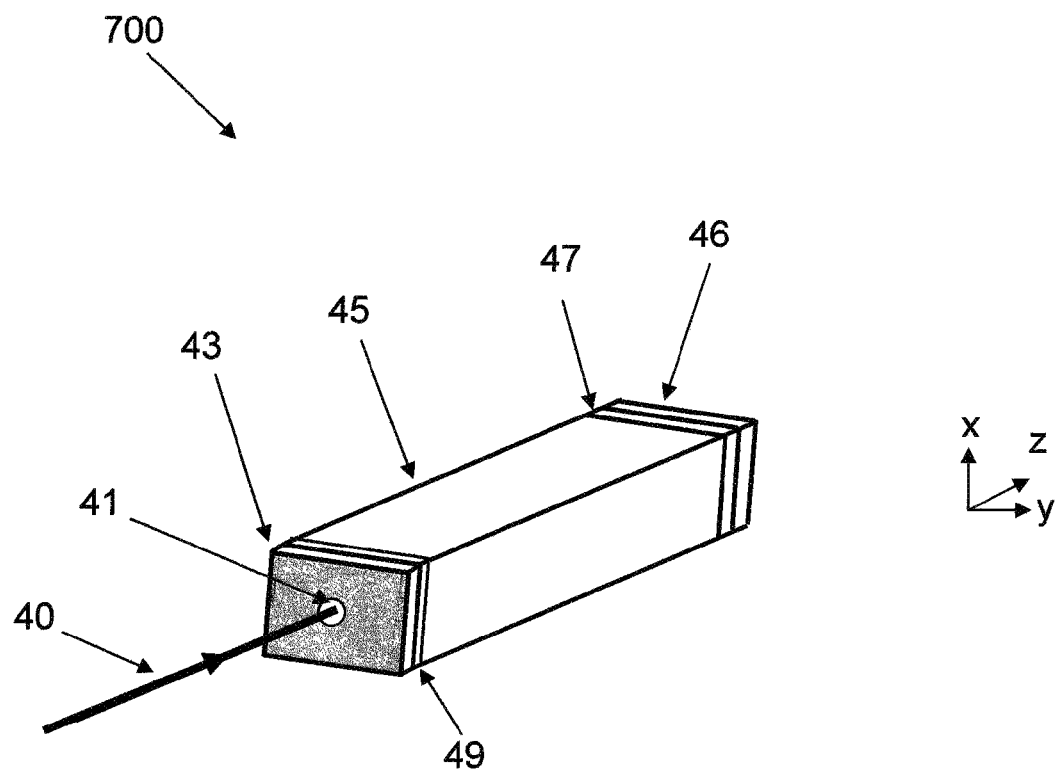
FIG. 7A is a perspective view of a speckle reduction apparatus utilizing a highly reflective mirror, a partially reflective mirror, light guide, an optional retardation plate, a variable thickness plate and an optional plano-concave lens.
Figure 7B:
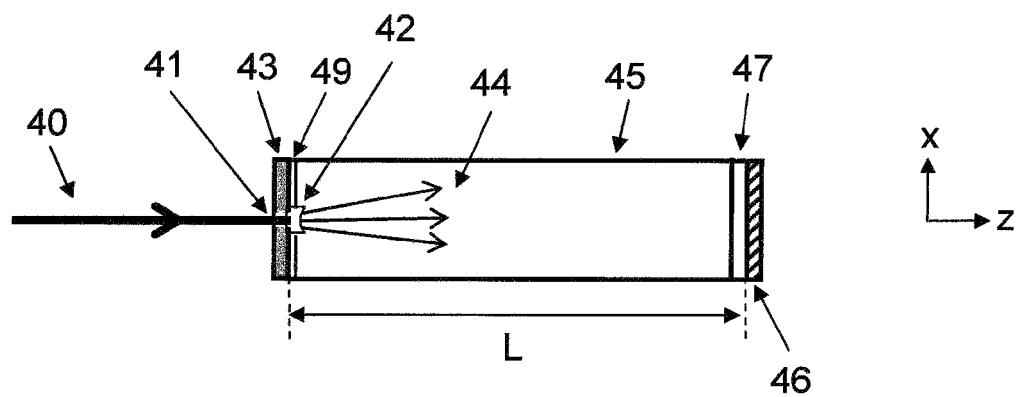
FIG. 7B is a cross-sectional view of the system of FIG. 7A.

FIGS. 7A-B show perspective and cross-sectional views, respectively, of another speckle reduction apparatus 700. The apparatus 700 includes the light guide 45, a highly reflective mirror 43, a partially reflective mirror 46, an optional retardation plate 47, a variable thickness plate 49 and an optional plano-concave lens 42. The variable thickness plate 49 is used to induce a variable phase shift within the light beam which leads to transmitting beamlets with different phase shifts and reduced speckle pattern. The variable thickness plate 49 has uniform or random variations in thickness across the surface area. Such variations can be step-like or smooth and do not rearrange the angular distribution of the light beam.

The distance L between the highly reflective mirror 43 and partially reflective mirror 46 is preferably equal to an integer multiple of half the coherence length of the laser beam 40.

Figure 8A:
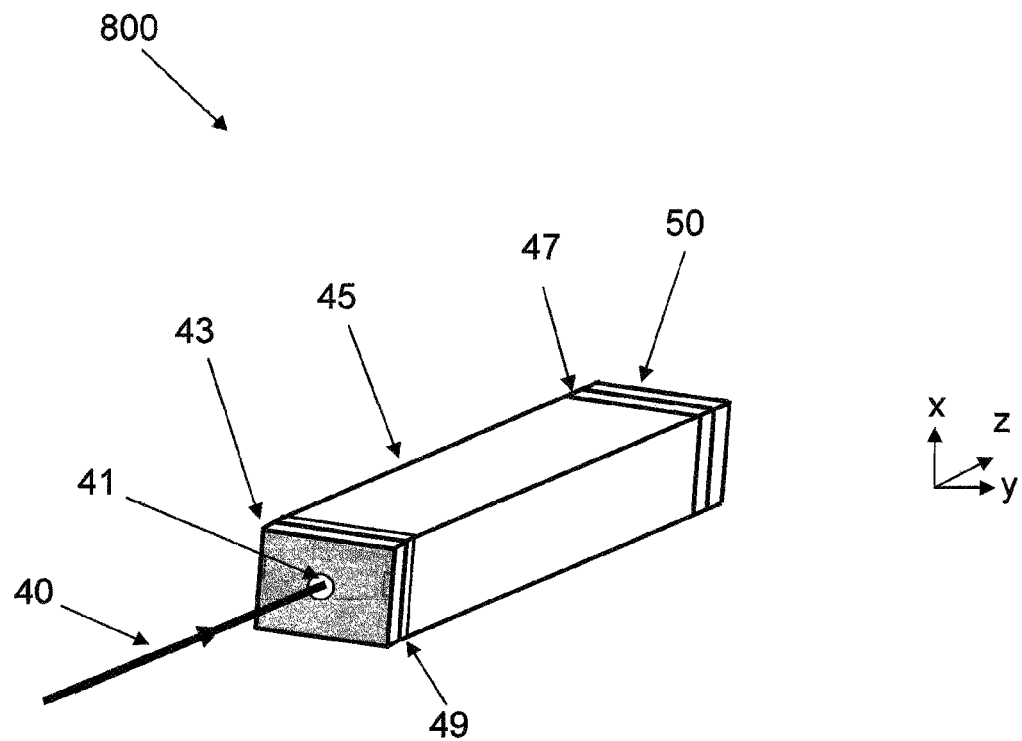
FIG. 8A is a perspective view of a speckle reduction apparatus utilizing a highly reflective mirror, a collimating plate, light guide, an optional retardation plate, an optional variable thickness plate and an optional plano-concave lens.
Figure 8B:
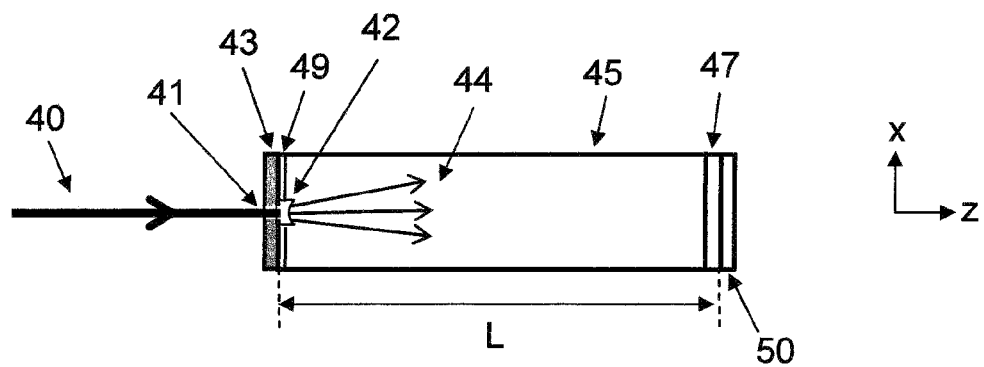
FIG. 8B is a cross-sectional view of the system of FIG. 8A.

FIGS. 8A-B show perspective and cross-sectional views of another speckle reduction apparatus 800. The apparatus 800 includes the light guide 45, an optional retardation plate 47, an optional variable thickness plate 49, an optional plano-concave lens 42 and a collimating plate 50. In addition to acting as a light collimator, the collimating plate 50 performs the function of the partially reflective mirror 46. More specifically, the collimation plate 50 can be used as a partially reflective mirror at the exit face of the light guide 45 to provide control over the intensity and angle of delivered light at each point on the surface of the collimation plate 50.

The optional variable thickness plate 49 can be replaced by an optional transmissive diffuser. It is also possible to replace both of the highly reflective mirror 43 and the optional variable thickness plate 49 with a reflective diffuser.

Figure 9A:
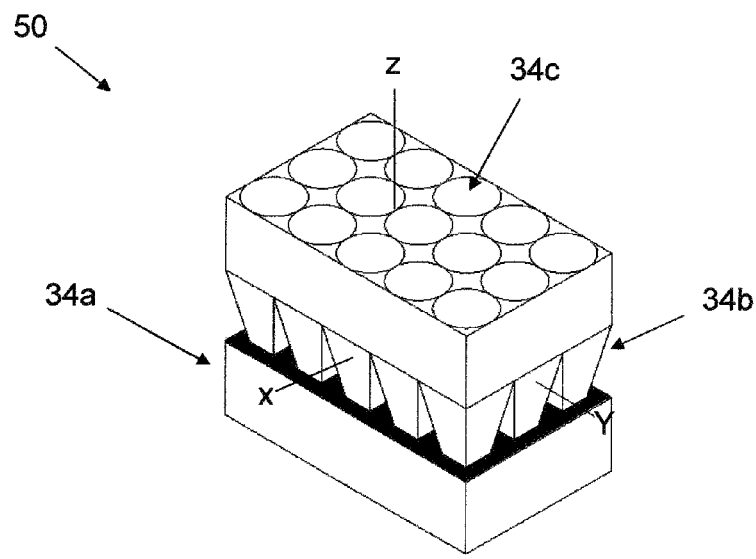
FIG. 9A is a detailed perspective view of a first collimating plate comprising micro-aperture, micro-guide and micro-lens arrays.

FIG. 9A is a detailed perspective view of the collimating plate 50 of FIGS. 8A-B. The collimating plate 50 includes an aperture plate 34a, micro-guide array 34b and a micro-lens array 34c. Each micro-lens corresponds to a micro-guide and a micro-aperture. As shown in FIG. 9D, the aperture array 34a includes a plate made of a transmissive material 34a1 that is highly transmissive of the desired laser wavelength. The top surface of the plate has a patterned, highly reflective coating 34a2 applied thereto.

Figure 9B:
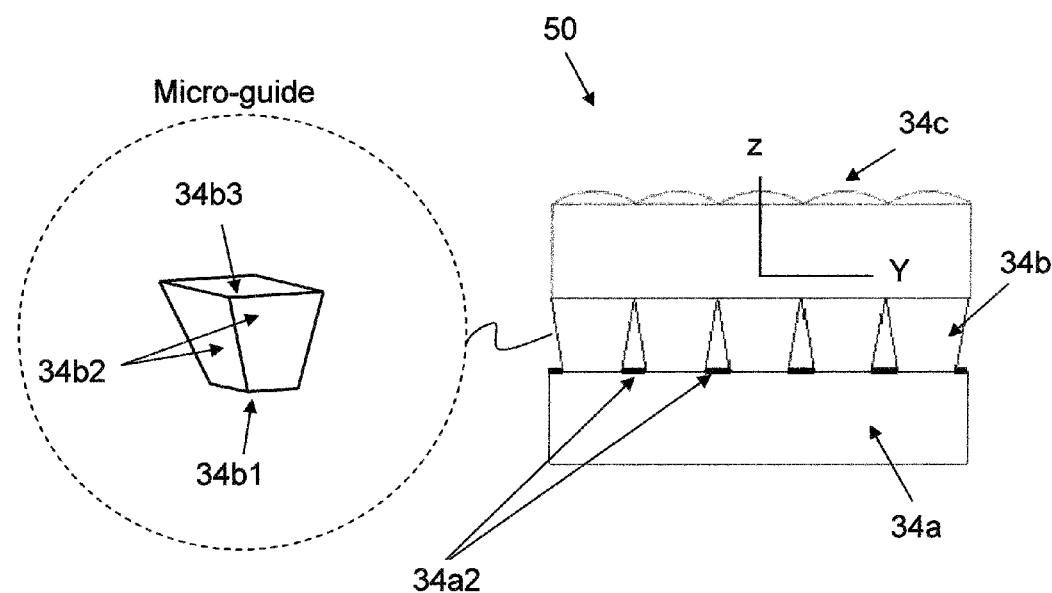
FIG. 9B is a cross-sectional view of the collimating plate of FIG. 9A.
Figure 9C:
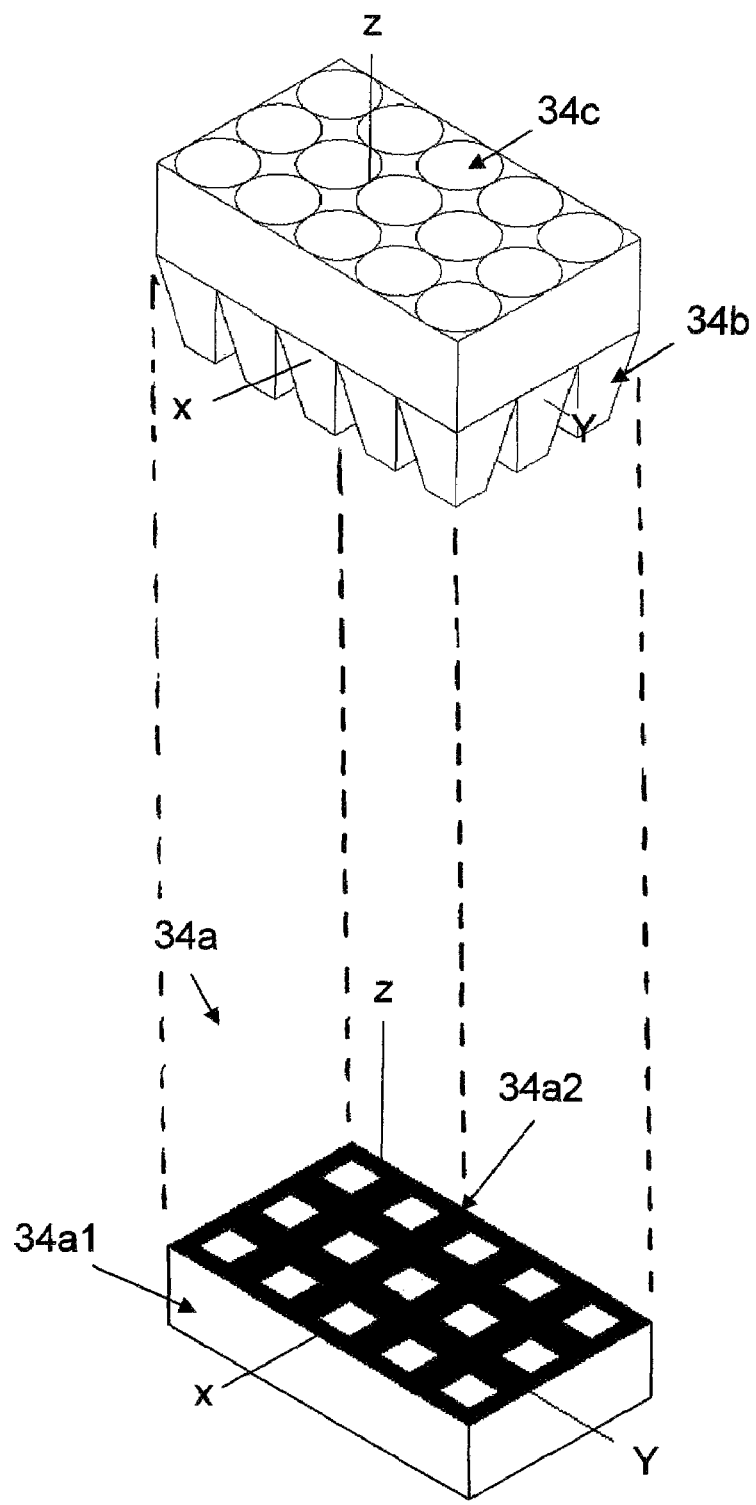
FIG. 9C is an exploded view of the collimating plate of FIG. 9A.

A perspective view of the micro-guide 34b and micro-lens 34c arrays is shown in FIG. 9C. Both arrays 34b and 34c are made on a single glass plate. A cross-sectional view of the aperture 34a, micro-guide 34b and micro-lens 34c arrays is shown in FIG. 9B. In applications where maintaining the polarization state of the laser is important, sidewalls of the micro-guides within the micro-guide array 34b can be oriented so that the polarization state of the light entering and exiting the micro-guide array 34b is maintained.

Design parameters of each micro-element (e.g., micro-guide, micro-lens or micro-tunnel) within an array 34a, 34b and 34c include shapes and sizes of entrance and exit apertures, depth, sidewall shapes and taper, and orientation. Micro-elements within an array 34a, 34b and 34c can have uniform, non-uniform, random or non-random distributions and can range in number from one micro-element to millions, with each micro-element capable of being distinct in its design parameters. The size of the entrance/exit aperture of each micro-element is preferably $\geq 5$ µm, in applications using visible light in order to avoid light diffraction phenomenon. However, it is possible to design micro-elements with sizes of entrance/exit aperture being <5 µm. In such applications, the design should account for the diffraction phenomenon and behavior of light at such scales to provide homogeneous light distributions in terms of intensity, viewing angle and color over a certain area. Such micro-elements can be arranged as a one-dimensional array, two-dimensional array, circular array and can be aligned or oriented individually. In addition, the collimating plate 50 can have a smaller size than the exit face of the guide 45 and its shape can be rectangular, square, circular or any other arbitrary shape.

The operation of the collimating plate 50 is described as follows. Part of the light impinging on the collimating plate 50 enters through the openings of the aperture array 34a and the remainder is reflected back by the highly reflective coating 34a2. Light received by the micro-guide array 34b experiences total internal reflection within the micro-guides and becomes highly collimated as it exits array 34b. This collimated light exits the micro-lens array 34c via refraction as a more collimated light. In addition to this high level of collimation, collimating plate 50 provides control over the distribution of delivered light in terms of intensity and cone angle at the location of each micro-element.

Figure 10A:
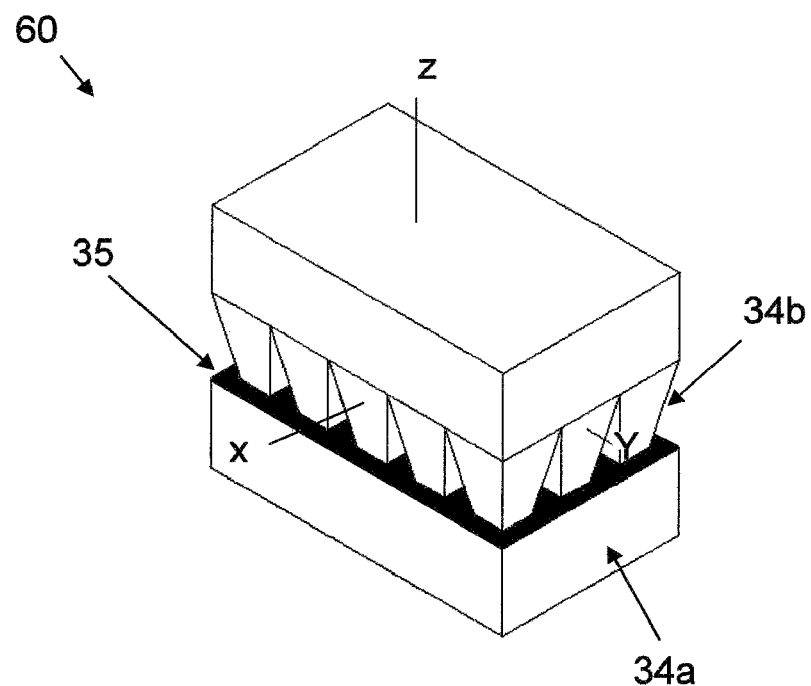
FIG. 10A is a perspective view of a second collimating plate comprising micro-aperture and micro-guide arrays.
Figure 10B:
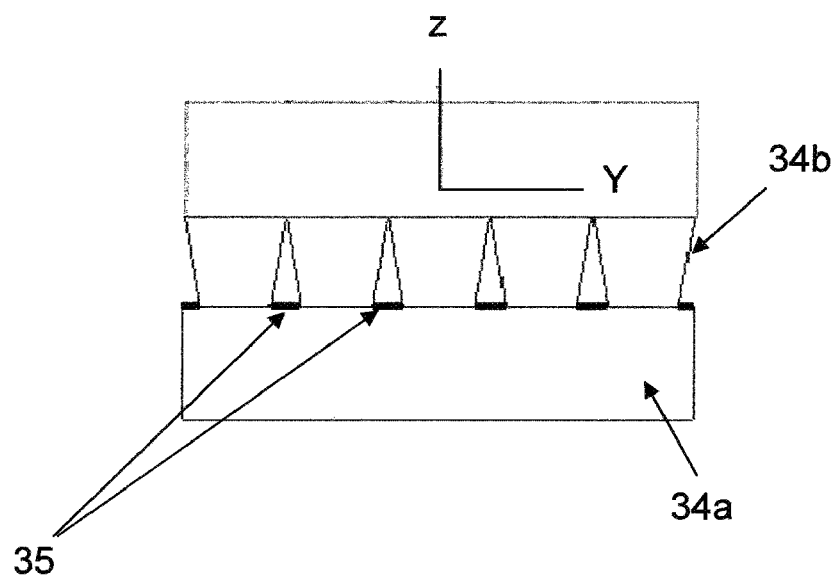
FIG. 10B is a cross-sectional view of the collimating plate of FIG. 10A.

FIGS. 10A-B show perspective and cross-sectional views of an alternative collimating plate 60 that can be used with the speckle reduction apparatus 800. The collimating plate includes a micro-guide array 34b and an aperture array 34a.

Figure 11A:
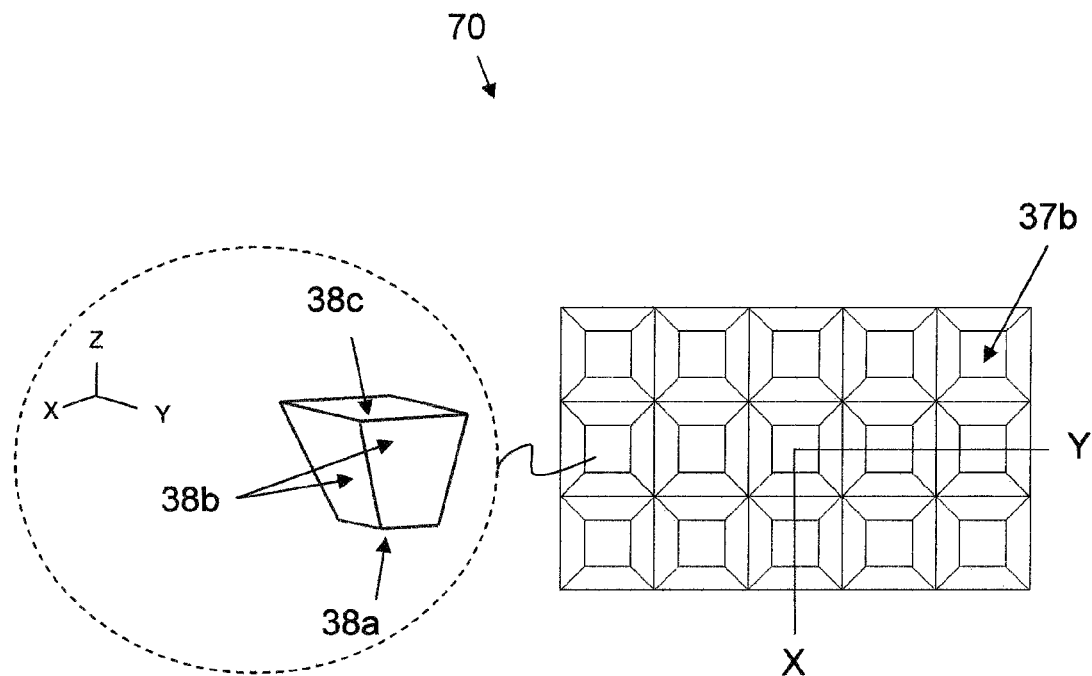
FIG. 11A is a top view of a third collimating plate comprising micro-aperture and micro-tunnel arrays.
Figure 11B:
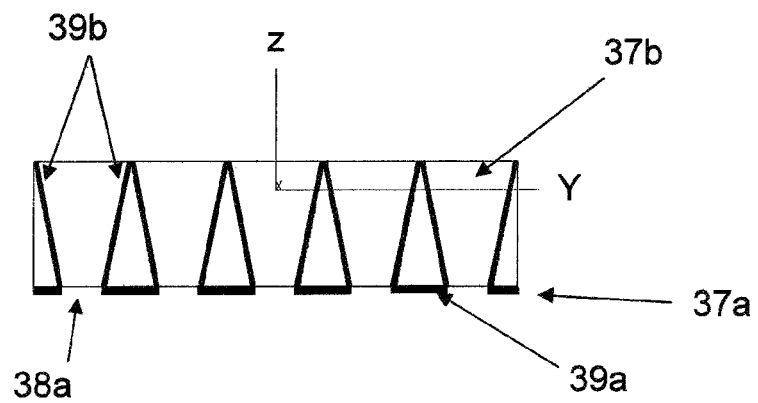
FIG. 11B is a cross-sectional view of the collimating plate of FIG. 11A.

FIGS. 11A-B show top and cross-sectional views of another alternative collimating plate 70 that can be used with the speckle reduction apparatus 800. The collimating plate 70 includes a hollow micro-tunnel array 37b and an aperture array 37a. The internal sidewalls 38b (exploded view of FIG. 11A) of each micro-tunnel are coated with a highly reflective coating 39b (FIG. 11B). Part of the light impinging on collimating plate 70 enters the hollow micro-tunnel array 37b and gets collimated via reflection. The remainder of this light gets reflected back by the highly reflective coating 39a of aperture array 37a. The advantages of collimating plate 70 are compactness and high transmission efficiency of light without the need for antireflective (AR) coatings at the entrance 38a and exit 38c apertures of its micro-tunnels.

Figure 12A:
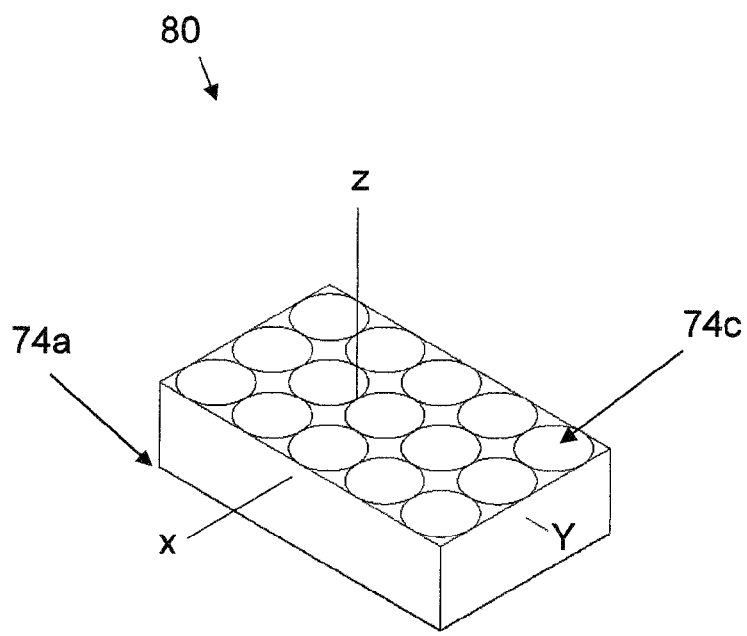
FIG. 12A is a perspective view of a fourth collimating plate comprising micro-aperture and micro-lens arrays.
Figure 12B:
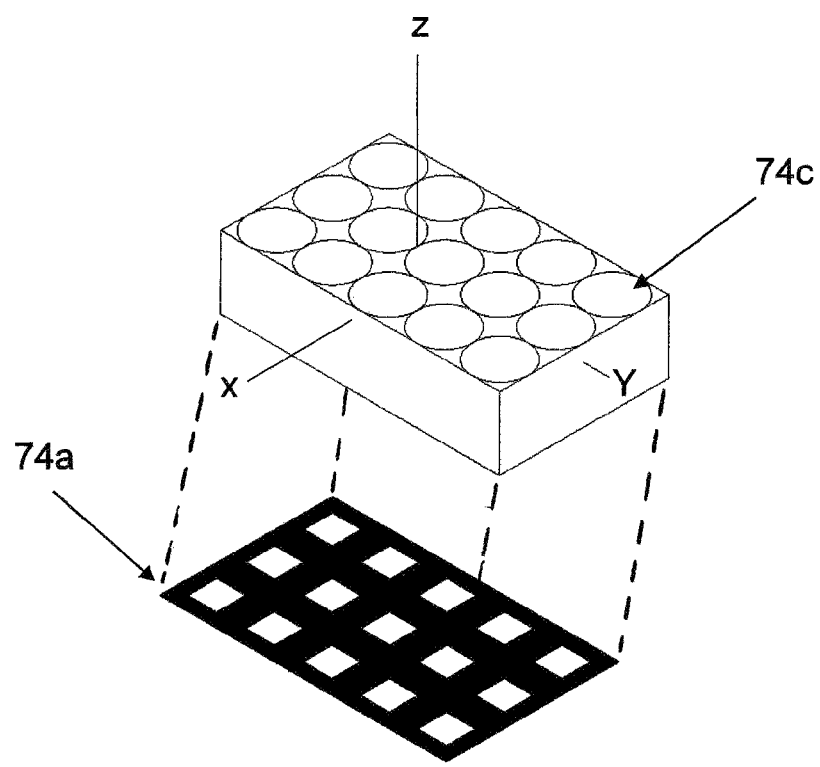
FIG. 12B is an exploded view of the collimating plate of FIG. 12A.
Figure 12C:
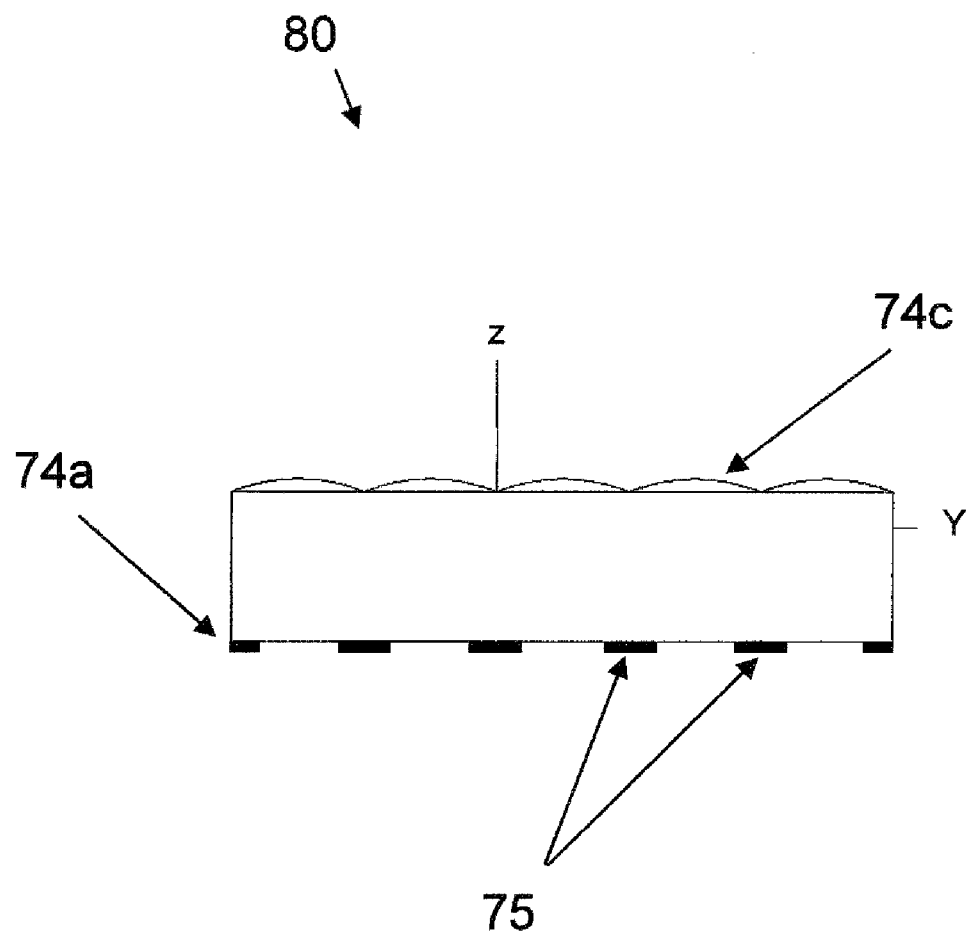
FIG. 12C is a cross-sectional view of the collimating plate of FIG. 12A.

FIGS. 12A-C show perspective (integrated and exploded) and cross-sectional views of another alternative construction of a collimating plate 80 that can be used with the speckle reduction apparatus 800. The collimating plate 80 includes an aperture array 74a and a micro-lens array 74c made on a single plate. In collimating plate 80, the micro-lens array 74c performs the collimation function of delivered radiation via refraction.

Additional details of the construction, manufacture and operation of collimating plates, such as example collimating plates 50, 60, 70 and 80, are given in related U.S. Pat. Nos. 7,306,344 and 7,318,644, and U.S. patent application Ser. No. 11/534,215, filed Sep. 21, 2006, all of which are incorporated herein by reference.

Figure 13:
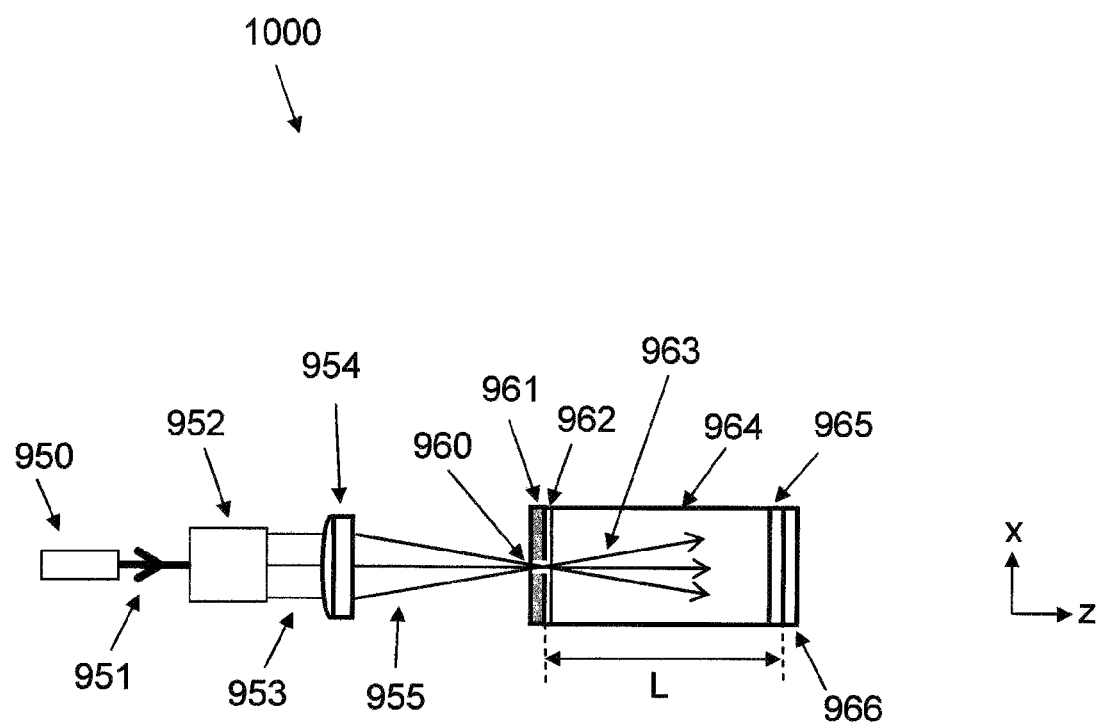
FIG. 13 is a cross-sectional view of a speckle reduction apparatus that receives a line of light.

FIG. 13 illustrates a speckle reduction apparatus 1000 that receives a line of light 955 rather than a circular or elliptical laser beam(s) 951 as shown in FIG. 13. Shaping optics 952 convert circular or elliptical light beam(s) 951 emitted from one or more lasers 950 into a collimated line of light 953 where all rays are parallel to the optical axis (i.e. z-axis). Cylindrical lens 954 focuses this collimated line of light 953 into a rectangular aperture 960 formed in the highly reflective mirror 961. Some examples of the shaping optics 952 are described in U.S. Pat. No. 6,323,984 B1 to J. I. Trisnadi, which is hereby incorporated by reference. The partially reflective mirror is preferably a one dimensional collimating plate 966 that reduces the cone angle (relative to the z-axis) of light exiting the speckle reduction apparatus 1000. Optional retardation plate 965 and variable thickness plate 962 are also shown in FIG. 13. The length of the light guide 964 is preferably equal to an integer multiple of half the coherence length of the original laser beam(s) 951.

Figure 14A:
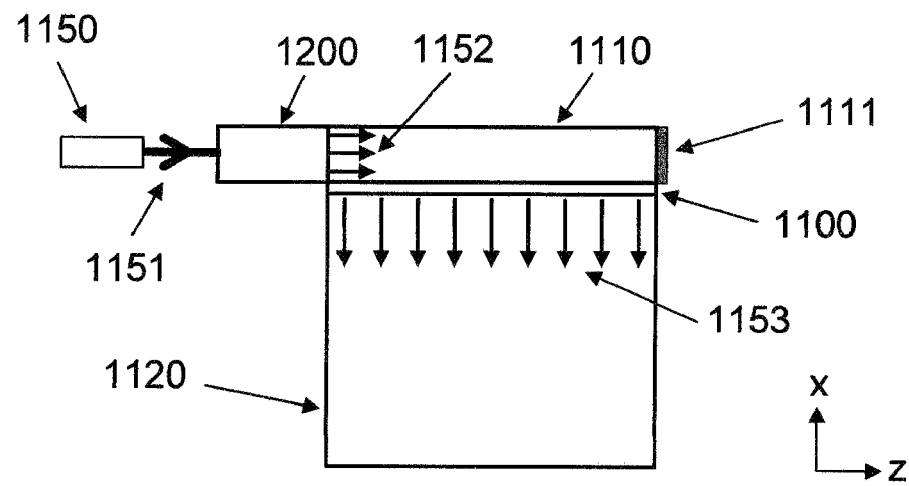
FIG. 14A is a top plan view of a speckle reduction apparatus in an edge-lit direct-view liquid crystal display.

FIG. 14A is a top plan view of a speckle reduction apparatus 1200 used in an edge-lit direct-view liquid crystal display. In this application, a micro-element plate 1100 is utilized to uniformly distribute the light beam 1151 of laser 1150 along the edge of a light guide plate 1120, after the light first passes through the speckle reduction apparatus 1200. The speckle reduction apparatus 1200 includes any of the speckle reduction apparatuses 200, 300, 400, 500, 600, 700, 800 disclosed herein.

Figure 14B:
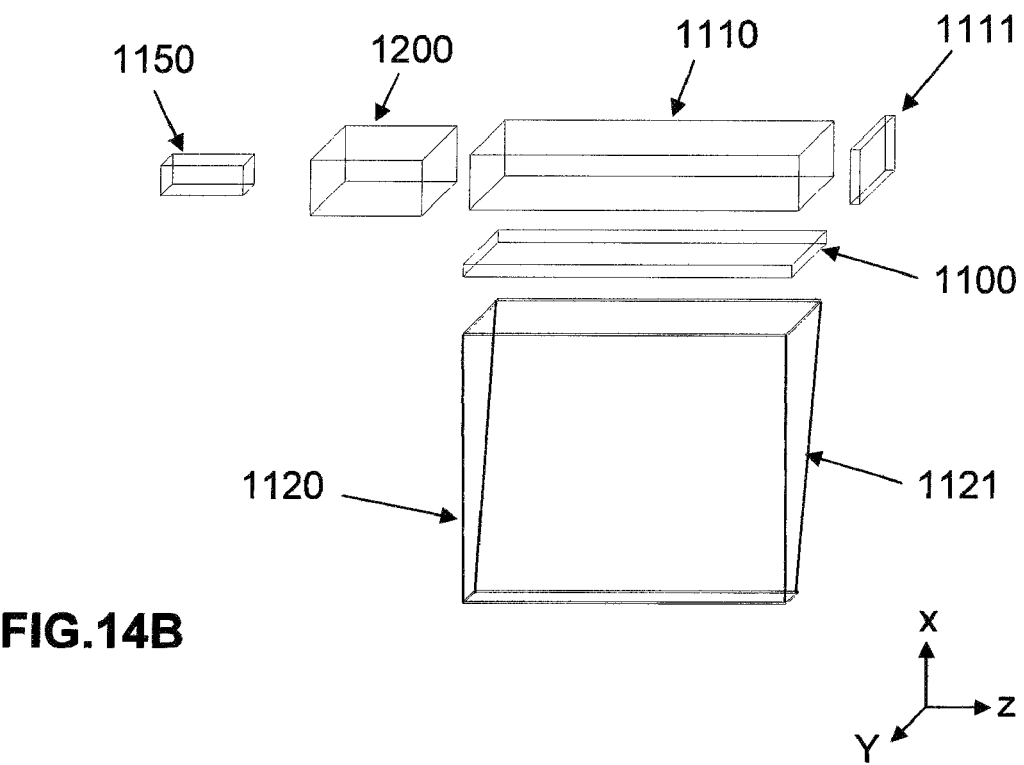
FIG. 14B is an exploded perspective side view of the LCD system of FIG. 14A.

FIG. 14B is an exploded perspective side view of the LCD system of FIG. 14A. The plate 1120, having a reflective bottom side 1121, is usually used in a direct view liquid crystal display (LCD) to couple light from a light source into a display panel placed on top of plate 1120. Laser light 1152 exiting the speckle reduction apparatus 1200 enters light pipe 1110 and travels toward the opposite end of light guide 1110. Micro-element plate 1100 is attached to light guide 1110 as shown in FIGS. 14A-B.

Millions of micro-elements (e.g. micro-lenses, micro-guides, micro-tunnels) formed on the surface of micro-element plate 1100 are used to couple light 1152 into light guide plate 1120. The coupled light enters light guide plate 1120 as light 1153 and gets extracted from light guide plate 1120 in the +Y direction toward the display panel. The micro-elements are distributed non-uniformly along micro-element plate 1100 and their density increases toward the back end of the micro-element plate 1100. Since the light intensity decreases as it travels toward the back end, this type of non-uniform micro-element distribution leads to a uniform light distribution along the edge of a light guide plate 1120. The back end of the micro-element plate 1100 is preferably coated with a highly reflective layer 1111 to avoid light leakage.

Figure 14C:
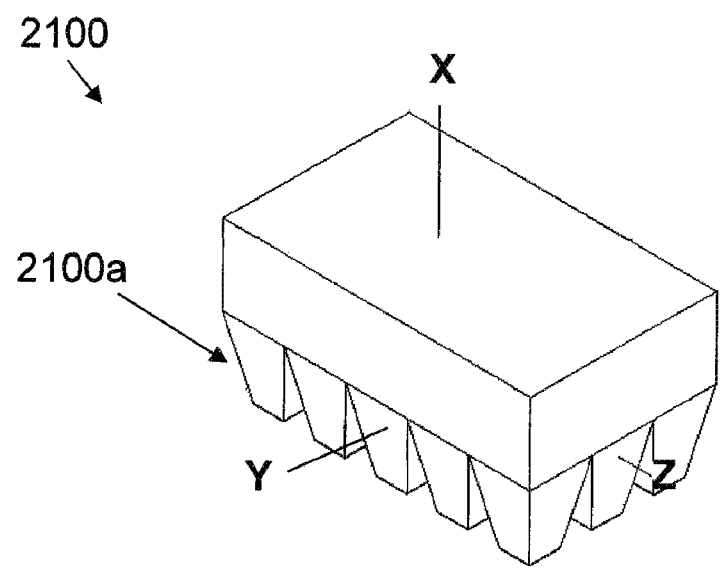
FIG. 14C is a perspective view of an example of a micro-element plate.

FIG. 14C shows plate 2100 as one example of micro-element plate 1100. As light 1152 travels within light guide 1110, it enters the micro-guides 2100a of plate 2100 and strikes the sidewalls of micro-guides 2100a. Light striking the micro-guides sidewalls gets refracted toward the light guide plate 1120. Design, operation and fabrication of the micro-element plate 1100 are described in related U.S. patent application Ser. Nos. 10/458,390, filed on Jun. 10, 2003 and 11/066,616, filed on Feb. 25, 2005.

It is also possible to have micro-element plate 1100 and light pipe 1110 integrated on a single plate.

Figure 14D:
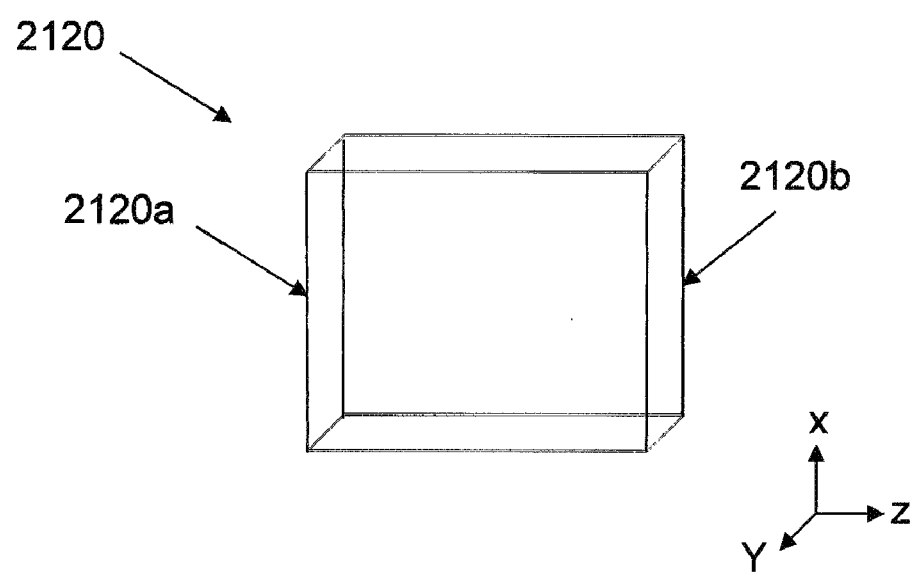
FIG. 14D is a perspective view of an example of a light guide plate.

FIG. 14D shows plate 2120 as another possible design of light guide plate 1120. In one implementation of plate 2120, highly reflective white paint is applied to its back side 2120b. Light 1153 traveling within plate 2120 is diffused upon striking the white paint. Large portion of the diffused light ends up (and after striking the white paint many times) exiting plate 2120 through its front surface 2120a (in the +Y direction) and enters the display panel (or the brightness enhancement films which are typically placed between the display panel and light guide plate 2120 for light collimation).

The plate 2120 might be implemented using micro-elements on its front 2120a and/or back 2120b surfaces and without the use of white paint. Such designs are known in the prior art. Light guide 1110, micro-element plate 1100 and 2100, and light guide plate 1120 and 2120 are made of optically transmissive material, such as glass or a polymer.

Figure 15A:
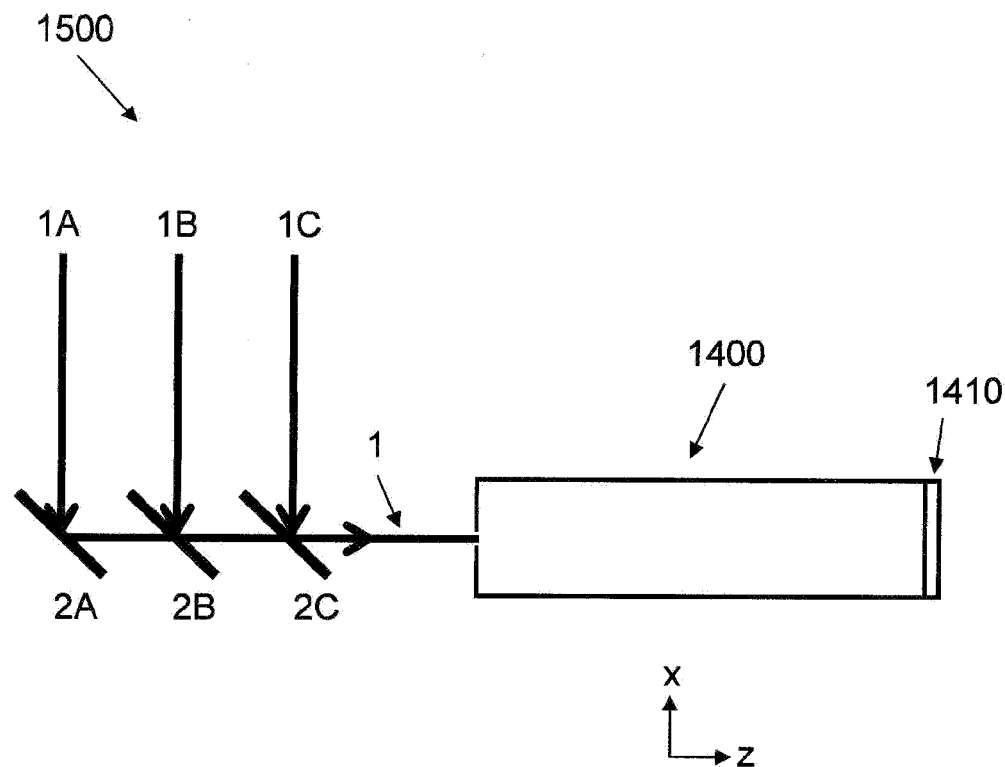
FIG. 15A is a top plan view of an illumination system utilizing red, green and blue lasers and a transmissive micro-display.
Figure 15B:
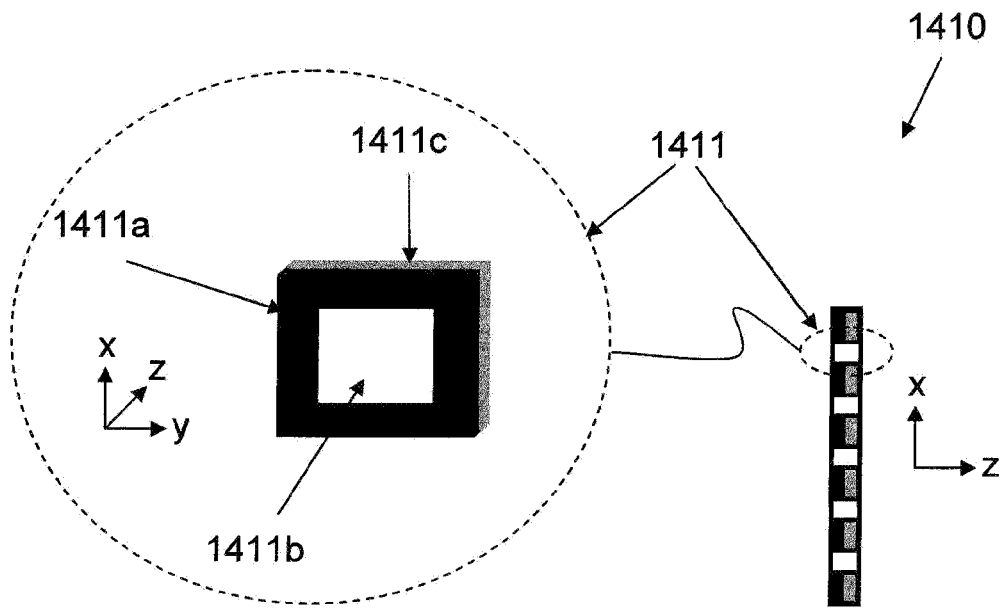
FIG. 15B includes a detailed cross-sectional view of the transmissive micro-display of FIG. 15A and a detailed perspective view of one pixel of the transmissive micro-display.

FIGS. 15A-B illustrate an illumination system 1500 utilizing red, green and blue lasers and a transmissive micro-display. The system 1500 includes three coherent light sources 1A, 1B and 1C, three dichroic beam splitters 2A, 2B and 2C, a laser speckle reduction apparatus 1400 and a transmissive display 1410. The speckle reduction apparatus 1400 includes any of the speckle reduction apparatuses 200, 300, 400, 500, 600, 700, 800 disclosed herein.

The three coherent light sources can be, for example, red 1A, green 1B and blue 1C lasers which are gated sequentially to produce a full color display. If the three coherent light sources 1A, 1B, and 1C are continuously operated rather than gated, the transmissive micro-display will utilize red, green and blue color filters in its structure to produce a full color micro-display image. The red 1A, green 1B and blue 1C lasers are combined using the dichroic beam splitters 2A, 2B and 2C. Element 2A can be a highly reflective mirror or a dichroic beam splitter that reflects red. Element 2B is a dichroic beam splitter that passes red from laser 1A and reflects blue from laser 1B and element 2C is a dichroic beam splitter that passes red and blue while reflecting green from laser 1C.

FIG. 15B is a cross-sectional view of the transmissive micro-display 1410, which can be, for example, high temperature poly silicon (HTPS) or low temperature poly silicon based micro-display. Each pixel 1411 has an open area 1411b where light can pass through and highly reflective area 1411a that reflects incident light back toward the laser speckle reduction apparatus 1400. The wiring and transistor areas 1411c of each pixel 1411 are hidden behind the highly reflective area 1411a.

Figure 15C:
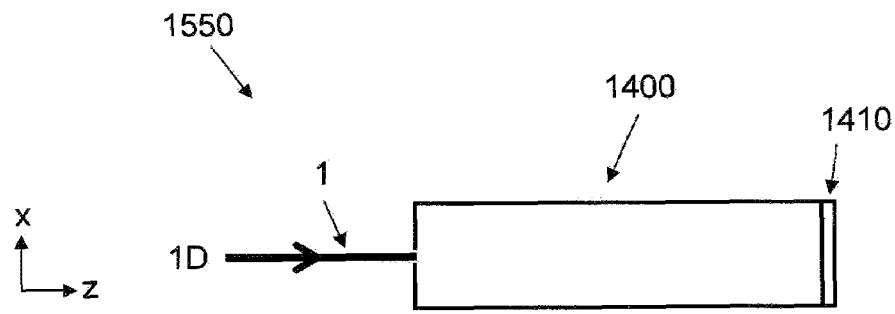
FIG. 15C is a cross-sectional view of an illumination system utilizing a tunable laser and a transmissive micro-display.

FIG. 15C illustrates an illumination system 1550 that utilizes a single tunable laser 1D to produce a full color display. In this system 1550, the three dichroic beam splitters 2A, 2B and 2C of FIG. 15A are eliminated.

Figure 15D:
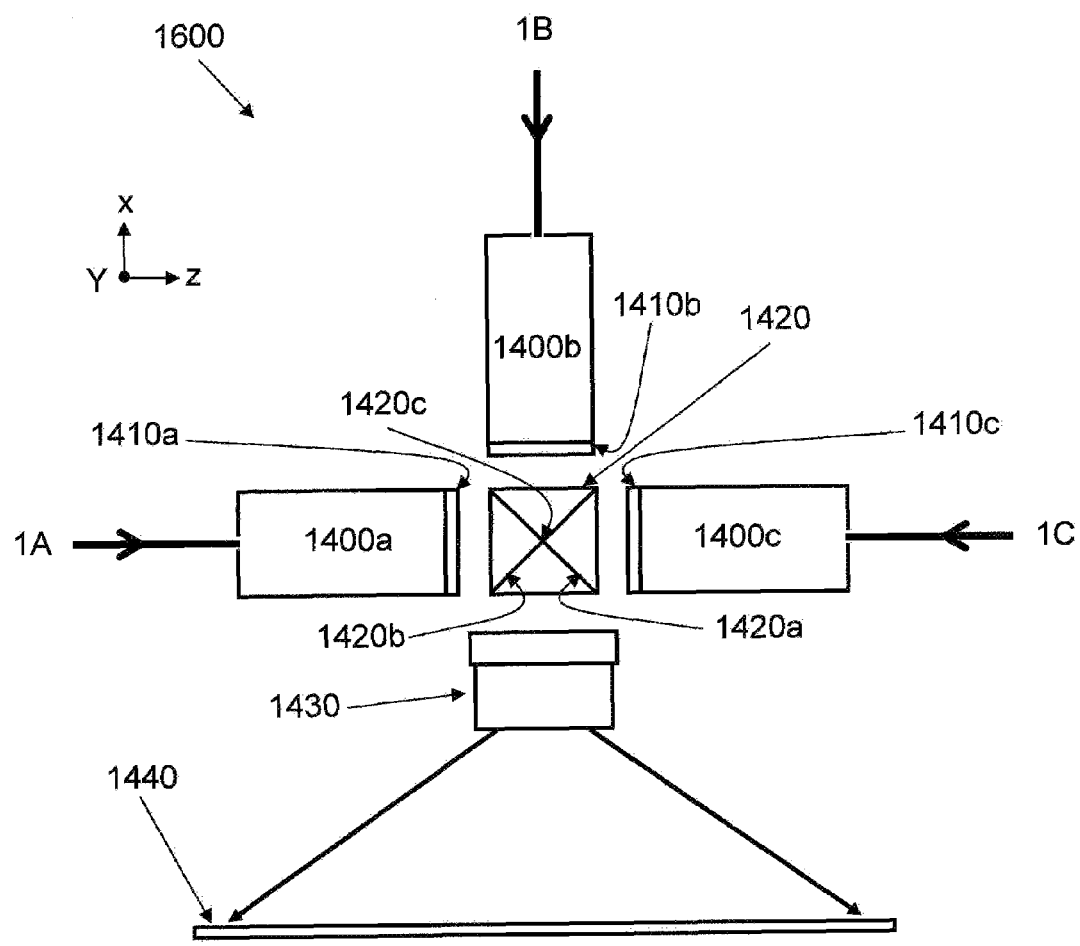
FIG. 15D is a cross-sectional view of a projection system utilizing red, green and blue lasers.

FIG. 15D shows a projection system 1600 that utilizes red 1A, green 1B and blue 1C lasers, three speckle reduction apparatuses 1400a, 1400b and 1400c, three transmissive micro-displays 1410a, 1410b and 1410c, a cross-dichroic prism 1420, a projection lens 1430 and a screen 1440 to produce a full color display.

The speckle reduction apparatuses 1400a-c include any of the speckle reduction apparatuses 200, 300, 400, 500, 600, 700, 800 disclosed herein.

In this system 1600, the lasers 1A, 1B and 1C continuously illuminate their corresponding micro-displays 1410a, 1410b and 1410c. The three transmissive micro-displays 1410a (red), 1410b (green) and 1410c (blue) modulate the light of the red, green and blue colors, respectively, according to image signals. The cross-dichroic prism 1420 has a multi-layer dielectric film stack 1420a that reflects red light and a multi-layer dielectric film stack 1420b that reflects blue light arranged in a form of a cross. The film stacks 1420a and 1420b are intersected by a center axis 1420c that extends along the y-axis. The light combined by the cross-dichroic prism 1420 is transmitted to a projection lens 1430, which in turn projects this light (i.e. image) onto a screen 1440.

The projection system 1600 of FIG. 15D utilizes combinations of coherent (e.g. lasers) and non-coherent (e.g. light emitting diodes (LEDs) and arc lamps) light sources for providing red, green and blue colors to the micro-display. Since blue lasers are very expensive when compared to green and red lasers (which are generally available at suitable power levels and acceptable price), this flexibility in using different types of light sources has the advantage of utilizing green and red lasers while using other non-coherent sources for the blue color. In this construction, the LED light and/or the focused arc lamp light are fed into systems 1400a and 1400b through the aperture of the highly reflective mirror. Since LED and arc lamp emit non-coherent light, systems 1400a and 1400b will not provide the speckle reduction function and will still provide the remaining benefits. The arc lamp light can be focused into the aperture of the highly reflective mirror using an elliptical reflector or a parabolic reflector followed by a focusing lens. The LED itself can be attached to the aperture of the highly reflective mirror mechanically or using suitable adhesive. The micro-displays of projection system 1600 of FIG. 15D can be of multiple types and resolutions. For example, the micro-display 1410c receiving blue light can have low resolution compared to the other two micro-displays 1410a and 1410b. Due to the low sensitivity of human eye to blue color relative to green and red colors, this arrangement leads to lower cost without compromising the projection system image quality.

In alternative constructions of the systems 1500, 1550, 1600, the transmissive micro-displays 1410, 1410a, 1410b and 1410c are themselves used as the partially reflective mirror in the speckle reduction apparatuses 1400, 1400a, 1400b and 1400c, thus, eliminating the need for an extra partially reflective mirror 46 in the speckle reduction apparatus 200, 300, 400, 500, 600, and 700 or a collimating plate 50, as in speckle reduction apparatus 800.

The advantages of the above illumination systems 1500, 1550 and 1600 include speckle removal, high compactness, and high brightness. The brightness of display systems utilizing these illumination systems 1500, 1550 and 1600 is higher than these of conventional systems even when the aperture ratio of the pixel 1411 is reduced. The aperture ratio is a ratio between the pixel's 1411 open area 1411b (FIG. 15B) and pixel's 1411 total area. The higher brightness is gained due to the recycling of the light that strikes the highly reflective area 1411a of pixel 1411 (FIG. 15B) within the speckle reduction apparatus 1400 until it passes through the pixel's open area 1411b. This increased brightness is achieved without the need for a micro-lens array (MLA) to enhance the brightness of transmissive micro-displays. Each micro-lens in the MLA is used in transmissive micro-displays to enhance the display brightness by focusing received light into the aperture of the corresponding pixel. The enhanced brightness (which is almost independent of the aperture ratio) permits further reduction of the pixel and micro-display sizes and thus reduction in the micro-display and projection systems costs.

Figure 16:
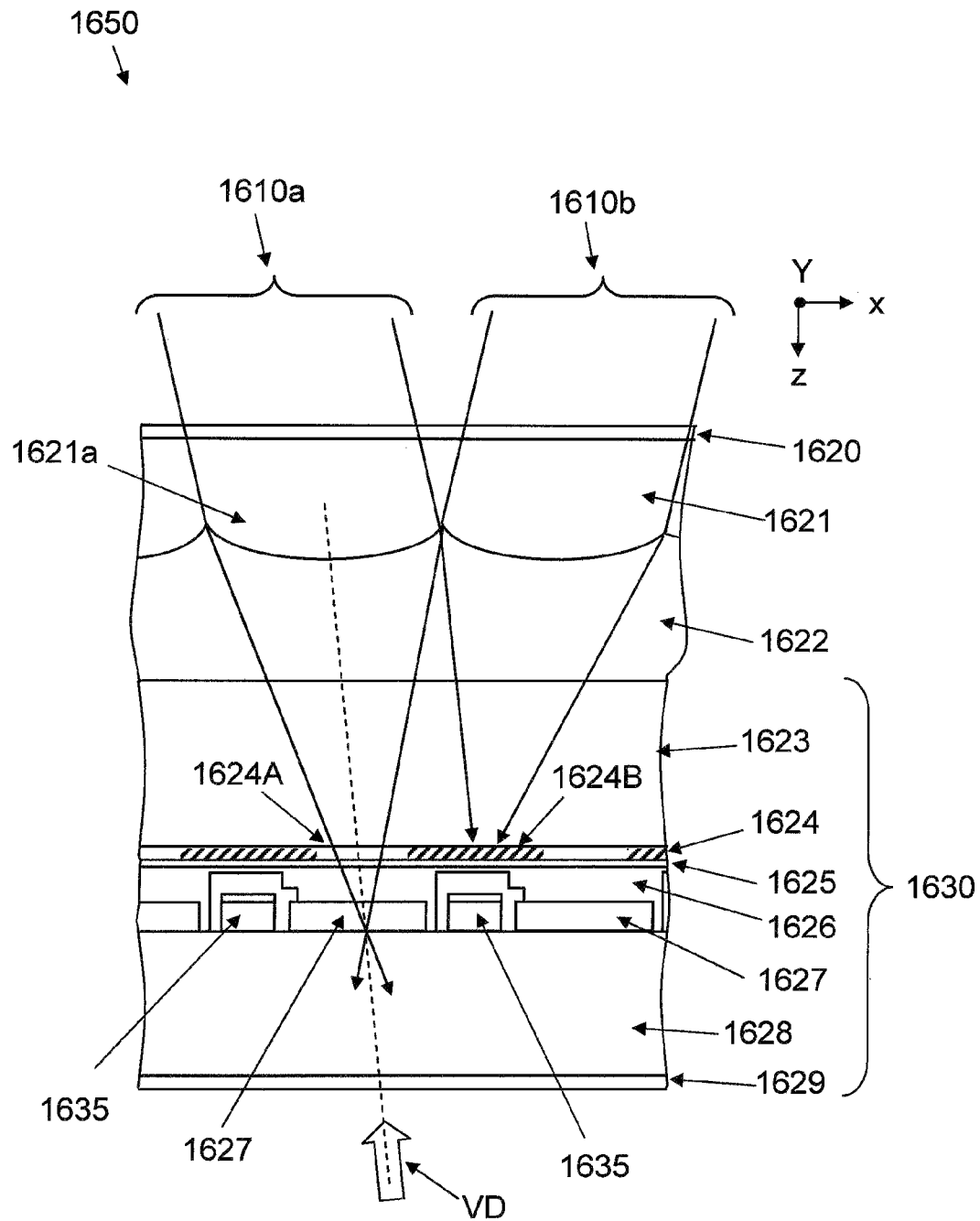
FIG. 16 is a cross-sectional view of a liquid crystal micro-display equipped with a micro-lens array (MLA).

FIG. 16 is a cross-sectional view of a liquid crystal micro-display 1650 equipped with a micro-lens array (MLA) 1621. The liquid crystal micro-display 1650 is itself used as a partially reflective mirror in the static speckle reduction apparatus 1400, 1400a, 1400b and 1400c, thus, eliminating the need for an extra partially reflective mirror 46 in the static speckle reduction apparatus 200, 300, 400, 500, 600, and 700 or a collimating plate 50 as in static speckle reduction apparatus 800.

The liquid crystal micro-display 1650 includes at least one liquid crystal cell 1630, a micro-lens array 1621 and a pair of polarizers 1620 and 1629.

The liquid crystal cell 1630 has a transparent electrode substrate 1628, a transparent counter substrate 1623, and a liquid crystal layer 1626 sandwiched between both substrates 1628 and 1623. A thin-film transistor 1635 and pixel electrode 1627 are made on the electrode substrate 1628 for each pixel. A common electrode 1625 is made on the counter substrate 1623. A highly reflective layer 1624 is provided between the counter substrate 1623 and the common electrode 1625. The highly reflective layer 1624 has a corresponding aperture (i.e. light transmissive opening) 1624A for each pixel electrode 1627.

Each pixel consists of one electrode 1627, common electrode 1625, and a liquid crystal layer 1626 sandwiched between both electrodes 1627 and 1625. Alternatively, the highly reflective layer can be provided on the plane of incidence (i.e. the upper surface of the counter substrate 1623) of the liquid crystal cell 1630, or on the electrode substrate 1628.

The micro-lens array 1621 is attached to the upper side of the counter substrate 1623 via a bonding layer 1622. The micro-lens array 1621 has a plurality of micro-lenses 1621*a*. The micro-lens array 1621 includes concentric (or non-concentric) lenses that are preferably positioned at an offset from the center axis of the corresponding pixel aperture 1624A.

Light entering the micro-lens array 1621 is divided into sub-beams by the plurality of micro-lenses 1621*a*. Each sub-beam 1610*a* that is parallel to the clear viewing direction VD (that usually leads to the highest image contrast) is focused in the vicinity of the corresponding pixel electrode 1627 passing through the aperture 1624A, the liquid crystal layer 1626, pixel electrode 1627, electrode substrate 1628, and polarizer 1629. Light that is not parallel to the clear viewing direction VD such as sub-beam 1610*b* having an angle of incidence symmetrical with that of the small beam 1610*a*, is also converged in the vicinity of the corresponding pixel electrode 1627 where it impinges at the highly reflective layer 1624B. This sub-beam 1610*b* gets reflected back and recycled within the static speckle reduction apparatuses 1400, 1400*a*, 1400*b* and 1400*c*. This reflected light impinges on the liquid crystal micro-display 1650 for a second time (after being recycled once within the static speckle reduction apparatuses 1400, 1400*a*, 1400*b* and 1400*c*) where it has a chance of exiting along the clear viewing direction VD, thus, enhancing the micro-display and projection system contrasts. This recycling process continues until most of the light exits in clear viewing direction VD. The liquid crystal micro-display 1650 can be made to display monochrome or color images.

The micro-lens array (MLA) 1621 has the advantage of enhancing the contrast ratio of the transmissive micro-display. Such micro-displays are discussed by Ogawa in U.S. Pat. No. 6,195,143 B1 and by Saito, et al. in U.S. Pat. No. 6,825,889 B1, which are hereby incorporated by reference. In order to have better light coupling efficiency, it is preferable that the light shield used in the micro-displays is a highly reflective layer.

Figure 17:
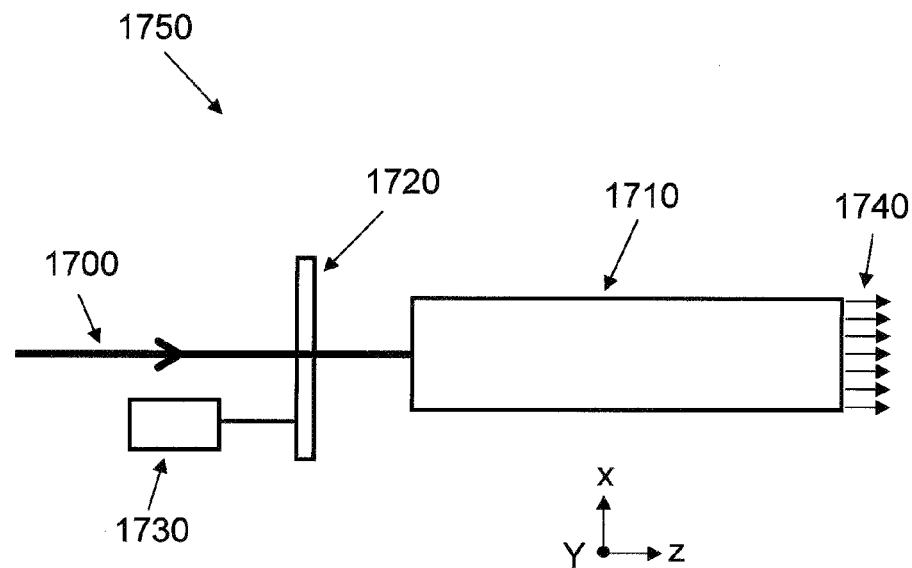
FIG. 17 is a cross-sectional view of a speckle reduction apparatus utilizing a moving diffuser at the input side.

FIG. 17 illustrates a speckle reduction apparatus 1750 including a moving diffuser 1720 at the input of the static speckle reduction apparatus 1710. The static speckle reduction apparatus 1710 can be any of the static speckle reduction apparatuses 200, 300, 400, 500, 600, 700, 800, 1000, 1200, 1400, 1400*a*, 140*b* and 1400*c*. Three moving or vibrating diffusers are needed in case of projection system 1600 of FIG. 15D. The diffuser 1720 is moved by means, generally designated 1730, in its plane with a rotary, vibratory or other motion. Rotary motion can be provided by a motor or coil. Alternatively, vibratory motion can be provided using a piezo transducer, which is driven by an alternating signal source and produces the needed vibrations.

The moving diffuser 1720 permits further reduction of the speckle pattern or noise, which in turn simplifies the design and enhances the optical efficiency of the static speckle reduction apparatus 1710.

Figure 18:
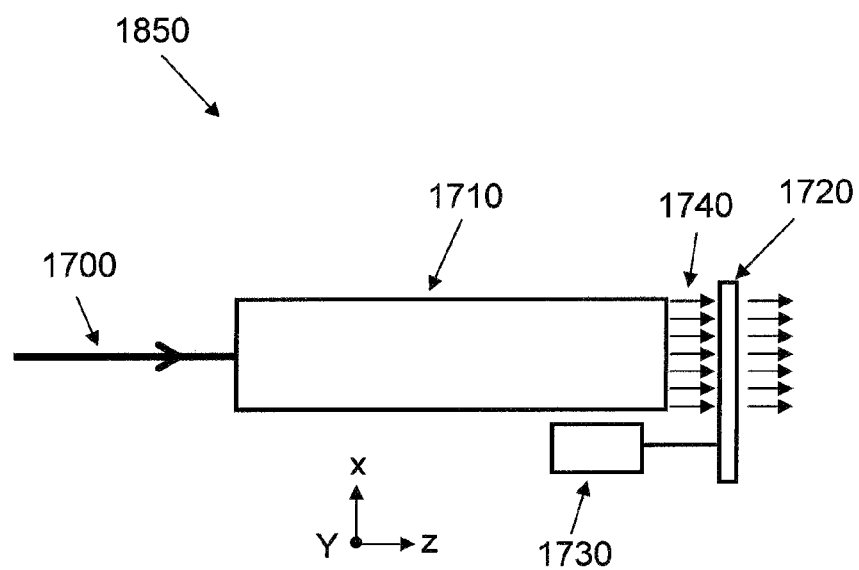
FIG. 18 is a cross-sectional view of a speckle reduction apparatus utilizing a moving diffuser at the output side.

FIG. 18 illustrates a speckle reduction apparatus 1850 utilizing a moving diffuser 1720 at the output of the static speckle reduction apparatus 1710. The static speckle reduction apparatus 1710 and moving diffuser 1720 are described above. In this apparatus 1850, the moving diffuser 1720 provides additional speckle reduction. In projection display systems, it is preferable to place the moving diffuser at an intermediate image plane. In long-throw projection systems, the moving diffuser is preferably placed at a position conjugate to the screen.

Other devices for reducing speckle can be used in connection with the static speckle reduction apparatuses 200, 300, 400, 500, 600, 700, 800, 1000, 1200, 1400, 1400*a*, 140*b* and 1400*c* disclosed herein, either at their input or output sides. Examples of these devices include the use of an electro-optic device, as described in U.S. Pat. No. 6,791,739 to Ramanujan et al., which is hereby incorporated by reference; flowing fluid diffusers; non-flowing fluid diffusers; and nutating diffusion plates as described in U.S. Pat. No. 5,534,950 to Hargis et al., which is hereby incorporated by reference.

A flowing fluid diffuser comprises a pair of closely spaced glass plates between which a highly turbid fluid flows. An example of such a turbid fluid is Liquid Paper®. This technique can remove speckle at modest flow rates. In non-flowing fluid diffusers, speckle is eliminated in the absence of flow or moving parts. Due the presence of particles that are sufficiently small in size suspended in a fluid diffuser. This phenomenon is caused by Brownian motion of the scattering particles.

The static speckle reduction apparatus 200, 300, 400, 500, 600, 700, 800, 1000, 1200, 1400, 1400*a*, 140*b* and 1400*c* can also be used in connection with a vibrating screen for further speckle reduction.

Alternatively, the partially reflective mirror (which can be, for example, a transmissive micro-display) can be moved via a vibratory or other motion to further reduce speckle. In this case, partially reflective mirror is positioned in close proximity to the light tunnel/pipe without being firmly attached to it.

Figure 19A:
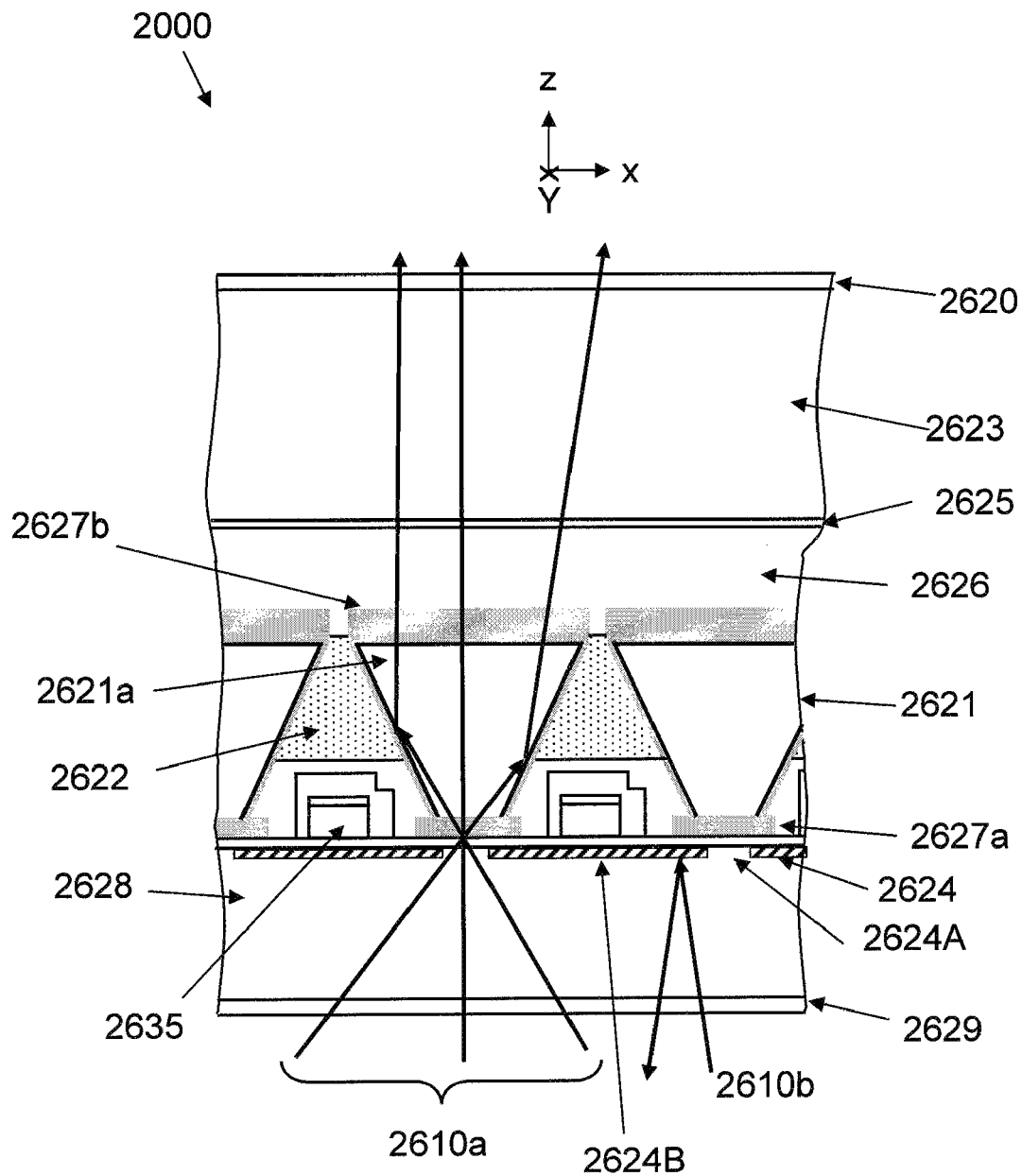
FIGS. 19A-B are cross-sectional views of an exemplary transmissive micro-display system.
Figure 19B:
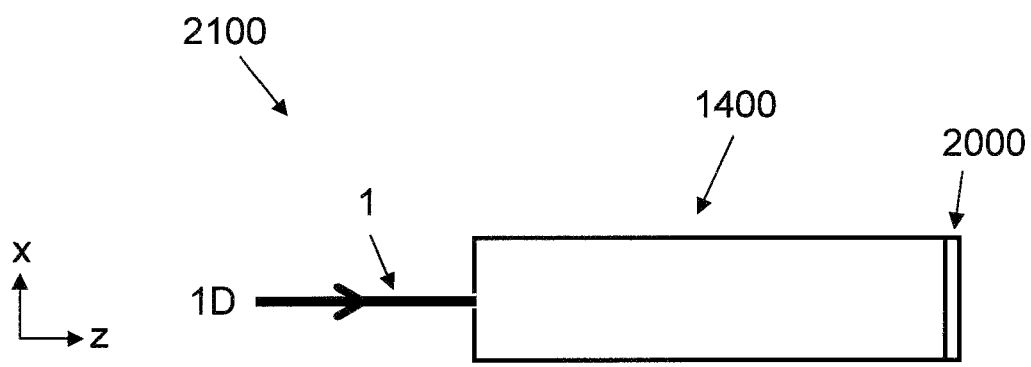

A transmissive micro-display 2000 is shown in FIG. 19A. FIG. 19B shows a speckle reduction apparatus 2100 utilizing the transmissive micro-display 2000 as a partially reflective plate.

FIG. 19A is an enlarged cross-sectional view of part of a liquid crystal micro-display 2000, which consists of a micro-guide array 2621, transparent electrode substrate 2628, a transparent counter substrate 2623, and a liquid crystal layer 2626 sandwiched between micro-guide array 2621 and counter substrates 2623. A thin-film transistor 2635 and pixel electrode 2627*b* are made on the electrode substrate 2628 for each pixel. A common electrode 2625 is made on the counter substrate 2623. A highly reflective layer 2624 is provided between the electrode substrate 2628 and the thin-film transistor 2635. The highly reflective layer 2624 has a corresponding aperture (i.e. light transmissive opening) 2624A for each pixel electrode base 2627*a*.

Each pixel consists of one electrode 2627*b*, electrode base 2627*a*, pixel electrode connector 2627*c*, common electrode 2625, and a liquid crystal layer 2626 sandwiched between both electrodes 2627*b* and 2625. The pixel electrode connector 2627*c* and electrode base 2627*a* are both used to provide electrical contact between the thin-film transistor 2635 and pixel electrode 2627*b*. The pixel electrode connector 2627*c* is deposited on the sidewalls and entrance aperture (i.e. micro-guide 2621*a* side facing the electrode base 2627*a*) of each micro-guide 2621*a*.

The micro-guide array 2621 is first made on a carrier substrate (not shown) and then the areas between adjacent micro-guides are filled with a material 2622 that has an index of refraction preferably lower than that of the micro-guide 2621a material. The filling material 2622 is planarized and then back etched to more than the thickness of the thin-film transistor 2635 array. The upper side (i.e. micro-guide array 2621 side) of the carrier substrate is then attached to the upper side of the electrode substrate 2628 via a bonding layer (not shown). The micro-guide array 2621 has a plurality of micro-guides 2621a preferably positioned at the center axis of the corresponding pixel aperture 2624A. The top side of the carrier substrate is removed or etched down until the pixel electrode connector 2627c is exposed. This step is followed by the deposition of electrode 2627b and making sure that electrode 2627b is overlapping electrode connector 2627c so that an electrical contact is provided to pixel electrode 2627b.

Light entering the micro-guide array 2621 is divided into sub-beams by the plurality of micro-guides 2621a. Each sub-beam 1610a is collimated by the micro-guide 2621a and delivered to the pixel electrode 2627b. The collimation occurs via total internal reflection. When the micro-guide 2621a are coated with an additional reflective layer between the pixel electrode connector 2627c and the filling material 2622 or between the micro-guide 2621a sidewall itself and the pixel electrode connector 2627c, collimation occurs via specular reflection. The collimated light passes through the pixel electrode 2627b, the liquid crystal layer 2626, common electrode 2625, counter substrate 2623, and polarizer 2620. Light that is does not enter through aperture 2624a such as ray 1610b is reflected by the highly reflective layer 2624B in the opposite direction. This ray 1610b gets reflected back and recycled within the static speckle reduction apparatus 1400 of FIG. 19B. This reflected light impinges on the liquid crystal micro-display 2000 for a second time (after being recycled once within the static speckle reduction apparatus 1400) where it has a chance of passing through aperture 2624a. This recycling process continues until most of the light exits through aperture 2624a. The liquid crystal micro-display 2000 can be made to display monochrome or color images.

The advantages of the micro-display 2000 is its high optical transmission efficiency, high contrast and the elimination of screen door effect (i.e. the image appears as if it is viewed through a screen door due to the opaque inter-pixel regions) when compared to conventional liquid crystal micro-displays.

The reflective coatings described herein are of the specular type and can be a metallic coating, dielectric coating, cold mirror coating, dichroic mirror coating, or a combination of these. The light guide 45 can be straight, tapered, cylindrical, square, rectangular, or spherical. The length of light guide 45 ranges from few millimeters to tens of millimeters depending on the laser source size, size of tunnel's entrance and exit apertures, cone angle of light propagating within the guide 45 and degree of desired light uniformity delivered by the speckle reduction apparatuses 200, 300, 400, 500, 600, 700, and 800. The entrance and exit apertures of the light guide 45 can be independent in terms of size and shape and can have different sizes and different shapes such as square, rectangular, circular, trapezoidal, polygonal, asymmetrical and even irregular shapes.

While one or more specific embodiments of the invention have been described above, it will be apparent to those of ordinary skill in the art that many more embodiments are possible that are within the scope of the invention. Further, the foregoing summary, detailed description and drawings are considered as illustrative only of the principles of the invention. Since other modifications and changes may be or become apparent to those skilled in the art, the invention is not limited the exact constructions and operations shown and described above, and accordingly, all suitable modifications and equivalents are deemed to fall within the scope of the invention, the invention being defined by the claims that follow.

What is claimed is:

1. An apparatus, comprising:
   a light guide having an entrance face and an exit face;
   a first mirror at the entrance face of the light guide, the first mirror having an aperture formed therein for admitting a predetermined input laser beam into the light guide; and
   a transmissive display receiving laser light from the exit face of the light guide, the transmissive display being configured to pass a first portion of the laser light incident thereon and to reflect a second portion of the laser light incident thereon back into the light guide toward the first mirror.

2. The apparatus of claim 1, wherein the distance between the first mirror and transmissive display is at least one-half the coherence length of the predetermined input laser beam.

3. The apparatus of claim 1, wherein the transmissive display is a micro-display.

4. The apparatus of claim 1, wherein the transmissive display includes a plurality of pixel apertures configured to pass the first portion of the laser light.

5. The apparatus of claim 1, wherein the transmissive display includes a reflective layer surrounding the pixel apertures.

6. The apparatus of claim 1, wherein each pixel aperture includes a partially reflective coating.

7. The apparatus of claim 1, further comprising a micro-lens array (MLA) aligned with the pixel apertures.

8. The apparatus of claim 1, wherein the transmissive display is located at the exit face of the light guide.

9. The apparatus of claim 1, further comprising a projection lens configured to receive light from the transmissive display.

10. The apparatus of claim 9, further comprising a screen configured to receive light from the projection lens.

11. An apparatus for reducing laser speckle, comprising:
    a light guide having an entrance face and an exit face;
    a first mirror at the entrance face of the light guide, the first mirror having an aperture formed therein for admitting a predetermined input laser beam into the light guide;
    a second, partially-reflective mirror at the exit face of the light guide, wherein the second mirror is capable of passing some of the laser beam incident thereon and reflecting some of the laser beam incident thereon back into the light guide toward the first mirror; and
    a transmissive display configured to receive laser light output from the second mirror.

12. The apparatus of claim 11, wherein the distance between the first and second mirrors is at least one-half the coherence length of the predetermined input laser beam.

13. The apparatus of claim 11, wherein the transmissive display is a micro-display.

14. The apparatus of claim 11, wherein the transmissive display includes a plurality of pixel apertures configured to pass some of the laser light incident on the transmissive display.

15. The apparatus of claim 14, wherein the transmissive display includes a reflective layer surrounding the pixel apertures.

16. The apparatus of claim 14, wherein each pixel aperture includes a partially reflective coating.

17. The apparatus of claim 14, further comprising a micro-lens array (MLA) aligned with the pixel apertures.

18. The apparatus of claim 14, further comprising:
    a plurality of micro-lenses, each corresponding to a pixel aperture.

19. The apparatus of claim 11, wherein the transmissive display is located at the exit face of the light guide.

20. The apparatus of claim 11, further comprising a projection lens configured to receive light from the transmissive display.

21. The apparatus of claim 20, further comprising a screen configured to receive light from the projection lens.

22. A method for reducing laser speckle, comprising:
providing a light guide having an entrance face and an exit face;
providing a first mirror at the entrance face of the light guide, the first mirror having an aperture formed therein;
providing a transmissive display receiving laser light from the exit face of the light guide, the transmissive display being configured to pass a first portion of the laser light incident thereon and to reflect a second portion of the laser light incident thereon back into the light guide toward the first mirror; and
directing the predetermined input laser beam into the aperture to produce output laser light, with reduced speckle, exiting from the transmissive display.

23. The method of claim 22, wherein the distance between the first mirror and the transmissive display is at least one-half the coherence length of the predetermined input laser beam.

24. The method of claim 22, wherein the transmissive display is a micro-display.

* * * * *